US011673556B2

(12) United States Patent
Hashimoto et al.

(10) Patent No.: US 11,673,556 B2
(45) Date of Patent: Jun. 13, 2023

(54) METHOD OF GENERATING VEHICLE CONTROL DATA, VEHICLE CONTROL DEVICE, AND VEHICLE CONTROL SYSTEM

(71) Applicant: TOYOTA JIDOSHA KABUSHIKI KAISHA, Toyota (JP)

(72) Inventors: Yohsuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 477 days.

(21) Appl. No.: 17/066,594

(22) Filed: Oct. 9, 2020

(65) Prior Publication Data

US 2021/0115834 A1   Apr. 22, 2021

(30) Foreign Application Priority Data

Oct. 18, 2019   (JP) .............................. JP2019-191092

(51) Int. Cl.
*B60W 30/19* (2012.01)
*B60W 30/188* (2012.01)
(Continued)

(52) U.S. Cl.
CPC ........ *B60W 30/19* (2013.01); *B60W 30/1882* (2013.01); *B60W 20/11* (2016.01);
(Continued)

(58) Field of Classification Search
CPC combination set(s) only.
See application file for complete search history.

(56) References Cited

U.S. PATENT DOCUMENTS 6,549,815 B1    4/2003 Kaji
9,182,764 B1 *  11/2015 Kolhouse ............... G08G 1/017
(Continued)

FOREIGN PATENT DOCUMENTS

CN   109709956 A   5/2019
CN   110254418 A   9/2019
(Continued)

OTHER PUBLICATIONS

Hu Yue et al: "Energy Management Strategy for a Hybrid Electric Vehicle Based on Deep Reinforcement Learning", Applied Sciences, vol. 8, No. 2, Jan. 26, 2018, pp. 1-15.
(Continued)

*Primary Examiner* — Binh Q Tran
(74) *Attorney, Agent, or Firm* — Oblon, McClelland, Maier & Neustadt, L.L.P.

(57) ABSTRACT

A method of generating vehicle control data includes: storing, with a storage device, relationship prescription data; operating, with an execution device, an operable portion of an internal combustion engine; acquiring, with the execution device, a detection value from a sensor that detects the state of the vehicle; calculating, with the execution device, a reward; and updating, with the execution device, the relationship prescription data using update mapping determined in advance, the update mapping using the state of the vehicle based on the detection value, an operation amount used to operate the operable portion, and the reward corresponding to the operation as arguments, and returning the relationship prescription data which have been updated such that an expected profit for the reward calculated when the operable portion is operated in accordance with the relationship prescription data increases.

20 Claims, 20 Drawing Sheets

(51) Int. Cl.
  *F01N 11/00* (2006.01)
  *F01N 13/00* (2010.01)
  *F01N 9/00* (2006.01)
  *B60W 20/11* (2016.01)
  *B60W 20/12* (2016.01)
  *B60W 50/00* (2006.01)

(52) U.S. Cl.
  CPC ......... *B60W 20/12* (2016.01); *B60W 50/0098* (2013.01); *B60W 2050/0013* (2013.01); *B60W 2050/0014* (2013.01); *B60W 2050/0018* (2013.01); *F01N 9/005* (2013.01); *F01N 9/007* (2013.01); *F01N 11/005* (2013.01); *F01N 11/007* (2013.01); *F01N 13/008* (2013.01); *F01N 2590/11* (2013.01); *F01N 2900/04* (2013.01); *F01N 2900/0402* (2013.01); *F01N 2900/0412* (2013.01); *F01N 2900/0416* (2013.01); *F01N 2900/0418* (2013.01); *F01N 2900/08* (2013.01); *F01N 2900/10* (2013.01); *F01N 2900/12* (2013.01); *F01N 2900/1411* (2013.01); *F01N 2900/1621* (2013.01)

(56) References Cited

U.S. PATENT DOCUMENTS

| | | | |
|---|---|---|---|
| 9,707,861 B2* | 7/2017 | Harris | G06Q 50/30 |
| 11,236,819 B1* | 2/2022 | Fujii | F16H 61/0265 |
| 2011/0106370 A1* | 5/2011 | Duddle | G09B 19/16 |
| | | | 701/31.4 |
| 2011/0264343 A1 | 10/2011 | Iwamoto et al. | |
| 2012/0117011 A1* | 5/2012 | Hashimoto | F02D 13/0226 |
| | | | 706/23 |
| 2016/0098869 A1* | 4/2016 | Rood | G07C 5/0808 |
| | | | 701/32.7 |
| 2016/0131062 A1 | 5/2016 | Ribordy et al. | |
| 2019/0202430 A1 | 7/2019 | Maeda | |
| 2020/0063681 A1* | 2/2020 | Neema | F02D 41/2454 |

FOREIGN PATENT DOCUMENTS

| | | |
|---|---|---|
| EP | 2 381 141 A1 | 10/2011 |
| EP | 2 381 141 B1 | 12/2014 |
| JP | 2000-250604 A | 9/2000 |
| JP | 2016-6327 A | 1/2016 |
| JP | 6547991 B1 | 7/2019 |

OTHER PUBLICATIONS

Hu Xiasong et al: "Reinforcement Learning for Hybrid and Plug-In Hybrid Electric Vehicle Energy Management: Recent Advances and Prospects", IEEE Industrial Electronics Magazine, IEEE, US, vol. 13, No. 3, Sep. 24, 2019 pp. 16-25.

Lin Xue et al: "Reinforcement Learning Based Power Management for Hybrid Electric Vehicles", 2014 IEEE/ACM International Conference on Computer-Aided Design (ICAAD), IEEE, Nov. 2, 2014, pp. 32-38.

* cited by examiner

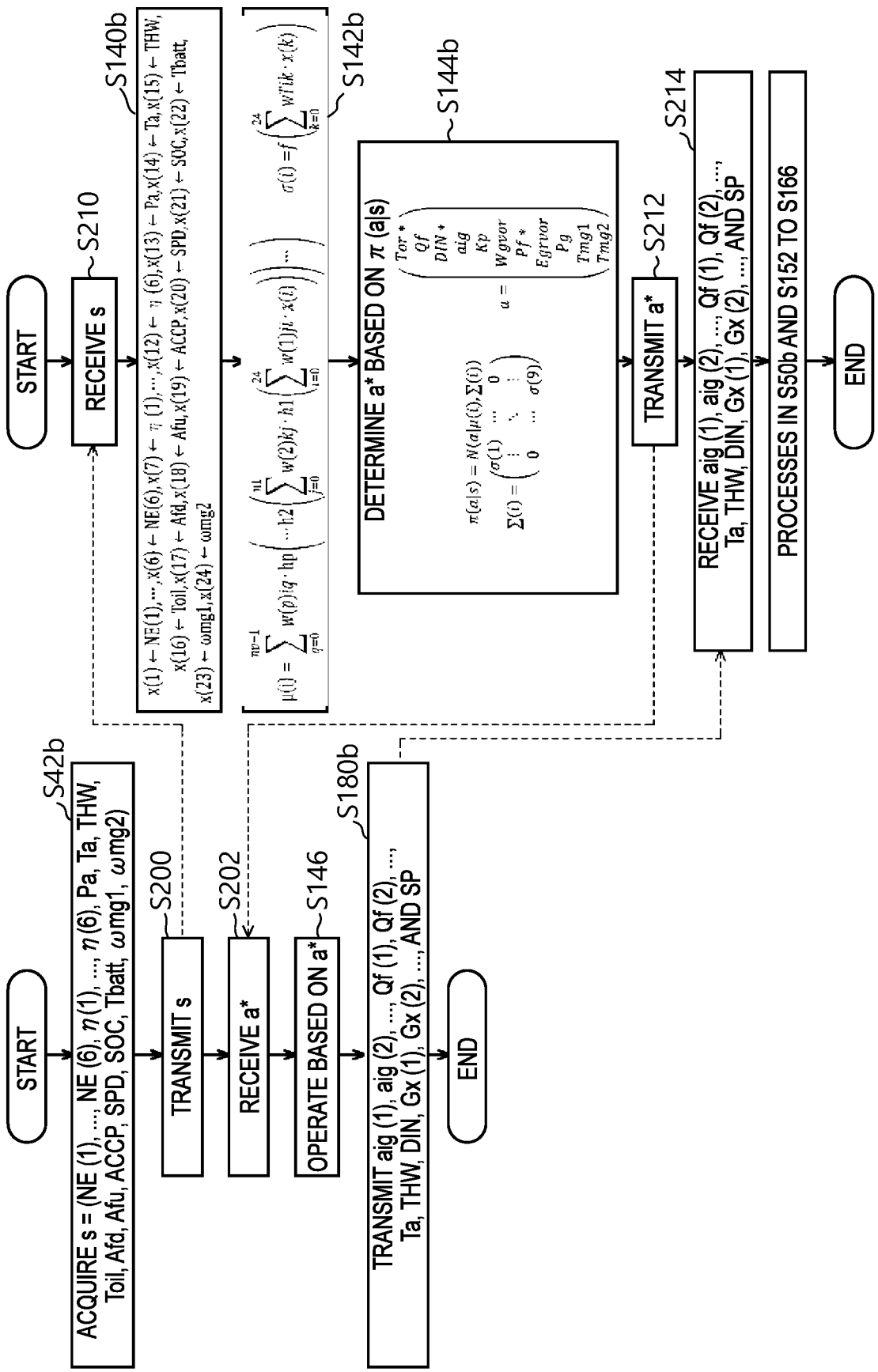

METHOD OF GENERATING VEHICLE CONTROL DATA, VEHICLE CONTROL DEVICE, AND VEHICLE CONTROL SYSTEM

INCORPORATION BY REFERENCE

The disclosure of Japanese Patent Application No. 2019-191092 filed on Oct. 18, 2019 including the specification, drawings and abstract is incorporated herein by reference in its entirety.

BACKGROUND

1. Technical Field

The disclosure relates to a method of generating vehicle control data, a vehicle control device, and a vehicle control system.

2. Description of Related Art

Japanese Unexamined Patent Application Publication No. 2016-6327 (JP 2016-6327 A), for example, describes a control device that operates a throttle valve, which is an operable portion of an internal combustion engine mounted on a vehicle, based on a value obtained by filtering an operation amount of an accelerator pedal.

SUMMARY

The above filtering is required to set an operation amount of the throttle valve of the internal combustion engine, which is mounted on the vehicle, to an appropriate operation amount in accordance with the operation amount of the accelerator pedal, and thus it is necessary that an expert should spend a lot of man-hours to adapt the filtering. In this manner, an expert has hitherto spent a lot of man-hours to adapt an operation amount etc. of a drive system such as the internal combustion engine in accordance with a state in the vehicle.

A method of generating vehicle control data according to a first aspect of the disclosure includes storing, with a storage device, relationship prescription data which are data that prescribe a relationship between a state of a vehicle that includes an internal combustion engine and an operation amount of an operable portion of the internal combustion engine, the state of the vehicle including a state of the internal combustion engine; operating, with an execution device, the operable portion; acquiring, with the execution device, a detection value from a sensor that detects the state of the vehicle; calculating, with the execution device, a reward from a viewpoint of at least one of a fuel consumption rate, an exhaust characteristic, and a drivability based on the detection value; and updating, with the execution device, the relationship prescription data using update mapping determined in advance, the update mapping using the state of the vehicle based on the detection value, an operation amount which is used to operate the operable portion, and the reward corresponding to the operation as arguments, and returning the relationship prescription data which have been updated such that an expected profit for the reward calculated when the operable portion is operated in accordance with the relationship prescription data increases.

A vehicle control device according to a second aspect of the disclosure includes a storage device and an execution device configured to perform the method according to the first aspect, wherein the execution device is configured to operate the operable portion based on the operation amount which is determined in accordance with the relationship prescription data and the state of the vehicle.

A vehicle control system according to a third aspect of the disclosure includes the vehicle control device according to the above second aspect, wherein: the execution device includes a first execution device mounted on the vehicle and a second execution device that is separate from in-vehicle devices; the first execution device executes at least the acquiring and the operating; and the second execution device executes at least the updating.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 20 is a flowchart illustrating the procedures of processes executed by the system according to the embodiment.

DETAILED DESCRIPTION OF EMBODIMENTS

First Embodiment

A method of generating vehicle control data according to a first embodiment will be described below with reference to the drawings.

Figure 1:
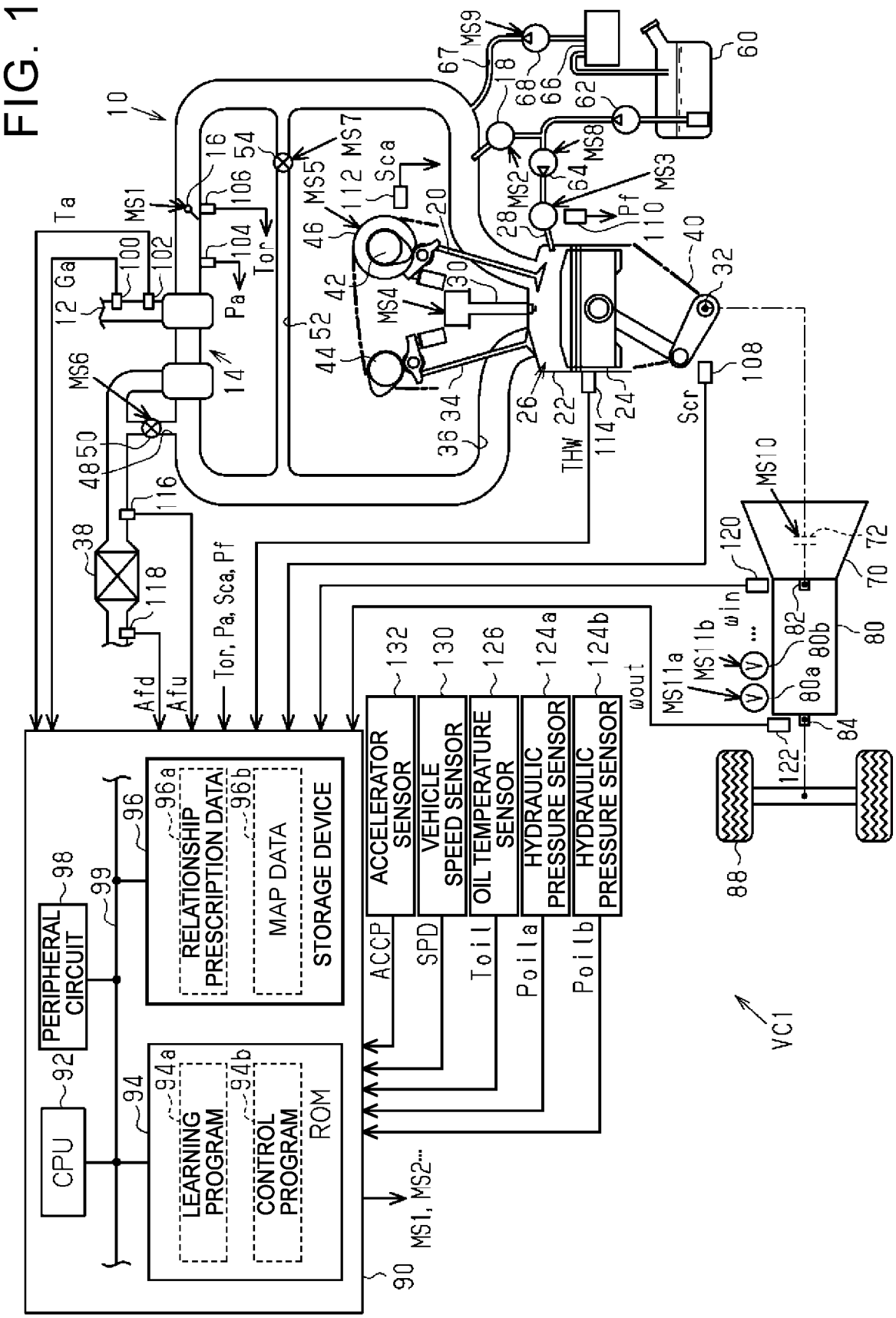
FIG. 1 illustrates a control device and a drive system of a vehicle according to a first embodiment.

FIG. 1 illustrates a control device and a drive system according to the present embodiment. As illustrated in FIG. 1, air taken in from an intake passage 12 of an internal combustion engine 10 flows toward the downstream side of the intake passage 12 via a supercharger 14. A throttle valve 16 is provided in the intake passage 12, at a position downstream of the supercharger 14. A port injection valve 18 is provided in the intake passage 12, at a position downstream of the throttle valve 16. Air taken into the intake passage 12 and fuel injected from the port injection valve 18 flow into a combustion chamber 26, which is defined by a cylinder 22 and a piston 24, as an intake valve 20 opens. Fuel is injected into the combustion chamber 26 by an in-cylinder injection valve 28. A mixture of the fuel and the air is combusted in the combustion chamber 26 as an ignition device 30 discharges a spark. Energy generated through combustion is converted into rotational energy of a crankshaft 32 via the piston 24.

The mixture which has been combusted is discharged as exhaust to an exhaust passage 36 as an exhaust valve 34 opens. A three-way catalyst (catalyst 38) that has an oxygen occlusion capability is provided in the exhaust passage 36 downstream of the supercharger 14. In addition, the exhaust passage 36 includes a detour passage 48 that detours around the supercharger 14. The detour passage 48 is provided with a waste gate valve (WGV) 50 that regulates the cross-sectional area of a flow path in the detour passage 48.

Rotational power of the crankshaft 32 is transferred to an intake camshaft 42 and an exhaust camshaft 44 via a timing chain 40. In the present embodiment, power of the timing chain 40 is transferred to the intake camshaft 42 via a variable valve timing device 46. The variable valve timing device 46 is an actuator that regulates the opening timing of the intake valve 20 by regulating the rotational phase difference between the crankshaft 32 and the intake camshaft 42.

In addition, the intake passage 12 is connected to the exhaust passage 36 via an exhaust gas recirculation (EGR) passage 52. The EGR passage 52 is provided with an EGR valve 54 that regulates the cross-sectional area of a flow path in the EGR passage 52. Fuel stored in a fuel tank 60 is pumped up by an engine-driven pump 62 to be supplied to the port injection valve 18. Meanwhile, the fuel which is stored in the fuel tank 60 is pressurized by an electronically-controlled high-pressure fuel pump 64, after being pumped up by the engine-driven pump 62, to be supplied to the in-cylinder injection valve 28. Fuel vapor generated in the fuel tank 60 is trapped by a canister 66. The canister 66 is connected to the intake passage 12 via a purge passage 67. The purge passage 67 is provided with a purge pump 68 that dispenses a fluid from the canister 66 side, which is the upstream side of the purge pump 68, to the intake passage 12 side, which is the downstream side of the purge pump 68.

An input shaft 82 of a transmission 80 can be mechanically coupled to the crankshaft 32 via a torque converter 70 with a lock-up clutch 72. The transmission 80 varies a speed ratio which is the ratio between the rotational speed of the input shaft 82 and the rotational speed of an output shaft 84. That is, the transmission 80 includes solenoid valves 80$a$, 80$b$, . . . , and can establish different speed ratios by switchably engaging and disengaging clutches in accordance with hydraulic pressures regulated by the solenoid valves 80$a$, 80$b$, . . . . The output shaft 84 is mechanically coupled to drive wheels 88.

A control device 90 controls the internal combustion engine 10, and operates operable portions of the internal combustion engine 10, such as the throttle valve 16, the port injection valve 18, the in-cylinder injection valve 28, the ignition device 30, the variable valve timing device 46, the WGV 48, the EGR valve 54, the high-pressure fuel pump 64, and the purge pump 68, in order to control torque, the exhaust component ratio, etc. which are control amounts of the internal combustion engine 10. The control device 90 also operates the lock-up clutch 72 and the solenoid valves 80$a$, 80$b$, . . . in order to control the state of engagement of the lock-up clutch 72 and the speed ratio of the transmission 80 as control amounts. In FIG. 1, operation signals MS1 to MS10 for the throttle valve 16, the port injection valve 18, the in-cylinder injection valve 28, the ignition device 30, the variable valve timing device 46, the WGV 50, the EGR valve 54, the high-pressure fuel pump 64, the purge pump 68, and the lock-up clutch 72, respectively, are indicated. In addition, operation signals MS11$a$, MS11$b$, . . . for the solenoid valves 80$a$, 80$b$, . . . , respectively, are also indicated in FIG. 1.

In controlling the control amounts, the control device 90 references an intake air amount Ga detected by an airflow meter 100, an intake air temperature Ta detected by an intake air temperature sensor 102, and a pressure (boost pressure Pa) in the intake passage 12 at a position downstream of the supercharger 14 detected by a boost pressure sensor 104. The control device 90 also references an opening degree (throttle opening degree Tor) of the throttle valve 16 detected by a throttle sensor 106 and an output signal Scr from a crank angle sensor 108. The control device 90 also references an output signal Sca from a cam angle sensor 112 and a temperature (water temperature THW) of cooling water in the internal combustion engine 10 detected by a water temperature sensor 114. The control device 90 also references an upstream-side detection value Afu which is a detection value from an upstream-side air-fuel ratio sensor 116 provided upstream of the catalyst 38, and a downstream-side detection value Afd which is a detection value from a downstream-side air-fuel ratio sensor 118 provided downstream of the catalyst 38. The control device 90 also references a rotational speed (input rotational speed ωin) of the input shaft 82 of the transmission 80 detected by an input-side speed sensor 120, and a rotational speed (output rotational speed ωout) of the output shaft 84 of the transmission 80 detected by an output-side speed sensor 122. The control device 90 also references a hydraulic pressure Poila regulated by the solenoid valve 80$a$ and detected by a hydraulic pressure sensor 124$a$, a hydraulic pressure Poilb regulated by the solenoid valve 80$b$ and detected by a hydraulic pressure sensor 124$b$, etc. The control device 90 also references a temperature (oil temperature Toil) of lubricating oil in the internal combustion engine 10 detected by an oil temperature sensor 126, a travel speed (vehicle speed SPD) of a vehicle VC1 detected by a vehicle speed sensor 130, and an operation amount (accelerator operation amount ACCP) of an accelerator pedal detected by an accelerator sensor 132.

The control device 90 includes a CPU 92, a ROM 94, a storage device 96 which is a non-volatile memory that is electrically rewritable, and a peripheral circuit 98, which can communicate with each other via a local network 99. The peripheral circuit 98 includes a circuit that generates a clock signal that prescribes internal operation, a power source circuit, a reset circuit, etc.

Figure 2:
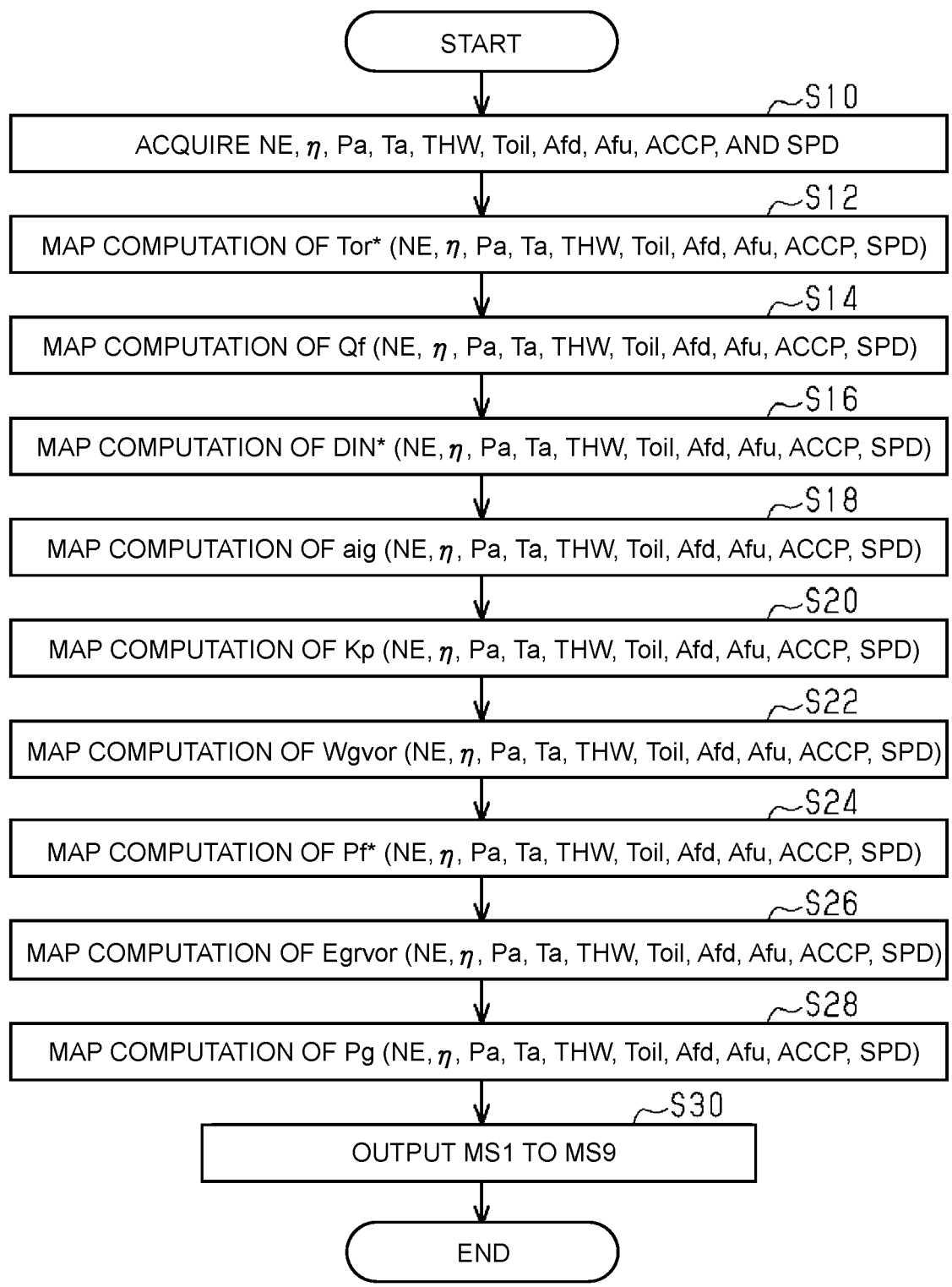
FIG. 2 is a flowchart illustrating the procedures of processes executed by the control device according to the embodiment.

The control device 90 executes control of the control amounts described above by the CPU 92 executing a program stored in the ROM 94. FIG. 2 illustrates the procedures of processes executed by the control device 90. The processes indicated in FIG. 2 are implemented by the CPU 92 executing a control program 94b, which is stored in the ROM 94, repeatedly at predetermined periods, for example. In the following, the respective step numbers of the processes are indicated by numerals preceded by the letter "S".

In the sequence of processes indicated in FIG. 2, the CPU 92 first acquires a rotational speed NE, a charging efficiency η, the boost pressure Pa, the intake air temperature Ta, the water temperature THW, the oil temperature Toil, the downstream-side detection value Afd, the upstream-side detection value Afu, the accelerator operation amount ACCP, and the vehicle speed SPD (S10). The rotational speed NE is calculated by the CPU 92 based on the output signal Scr from the crank angle sensor 108. Meanwhile, the charging efficiency η is calculated by the CPU 92 based on the rotational speed NE and the intake air amount Ga. The charging efficiency η is a parameter that determines the amount of air to be charged into the combustion chamber 26.

The CPU 92 sets the operation amounts of the various operable portions of the internal combustion engine 10 using the values acquired in the process in S10 as inputs through the processes in S12 to S28. The operation amounts are not limited to the actual operation amounts. In the case where open loop control is performed so as to achieve the operation amounts, or in the case where feedback control is performed so as to achieve the operation amounts, for example, command values for such control may be considered as the operation amounts.

Particularly, the CPU 92 sets a command value (throttle opening degree command value Tor*) for the opening degree of the throttle valve 16 in the process in S12, and sets an amount (required injection amount Qf) of fuel required to be injected in the process in S14. The CPU 92 also sets an intake phase difference command value DIN* which is a command value for the rotational phase difference (intake phase difference DIN) between the crankshaft 32 and the intake camshaft 42 in the process in S16, sets an ignition timing aig in the process in S18, and sets an injection distribution ratio Kp which is the ratio of the amount of fuel injected from the port injection valve 18 to the required injection amount Qf in the process in S20. The CPU 92 also sets a WGV opening degree command value Wgvor which is a command value for the opening degree of the WGV 50 in the process in S22, and sets a command value (fuel pressure command value Pf*) for the injection pressure of fuel injection from the in-cylinder injection valve 28 in the process in S24. The CPU 92 also sets an EGR opening degree command value Egrvor which is a command value for the opening degree of the EGR valve 54 in the process in S26, and sets an operation amount (purge operation amount Pg) of the purge pump 68 in the process in S28.

Particularly, the CPU 92 executes the processes in S12 to S28 using map data 96b illustrated in FIG. 1. The map data 96b include nine map data that include the nine operation amounts described above as output variables and variables corresponding to the values acquired in the process in S10 as input variables. The CPU 92 performs map computation of the nine operation amounts described above using the corresponding map data using the values acquired in the process in S10 as inputs.

The map data are a set of data that includes discrete values of the input variables and values of the output variables corresponding to the values of the input variables. The map computation may be a process of deriving, in the case where the value of the input variable coincides with any of the values of the input variable in the map data, the corresponding value of the output variable in the map data as the computation result, and deriving, in the case where the value of the input variable does not coincide with any of the values of the input variable in the map data, a value interpolated between a plurality of values of the output variable included in the map data as the computation result, for example.

The CPU 92 outputs the operation signals MS1 to MS9 to the respective operable portions (S30), in order to operate the operable portions based on the operation amounts set through the processes in S12 to S28. All the operation signals MS1 to MS9 are not determined uniquely in accordance with the operation amounts set through the processes in S12 to S28. For example, in the present embodiment, the throttle opening degree Tor is feedback-controlled in accordance with the throttle opening degree command value Tor*, and therefore the operation signal MS1 for the throttle valve 16 may have various values even when the throttle opening degree command value Tor* is the same.

The CPU 92 temporarily ends the processes indicated in FIG. 2 in the case where the process in S30 is completed. The map data 96b have been generated utilizing reinforcement learning. Generation of the map data 96b will be discussed in detail below.

Figure 3:
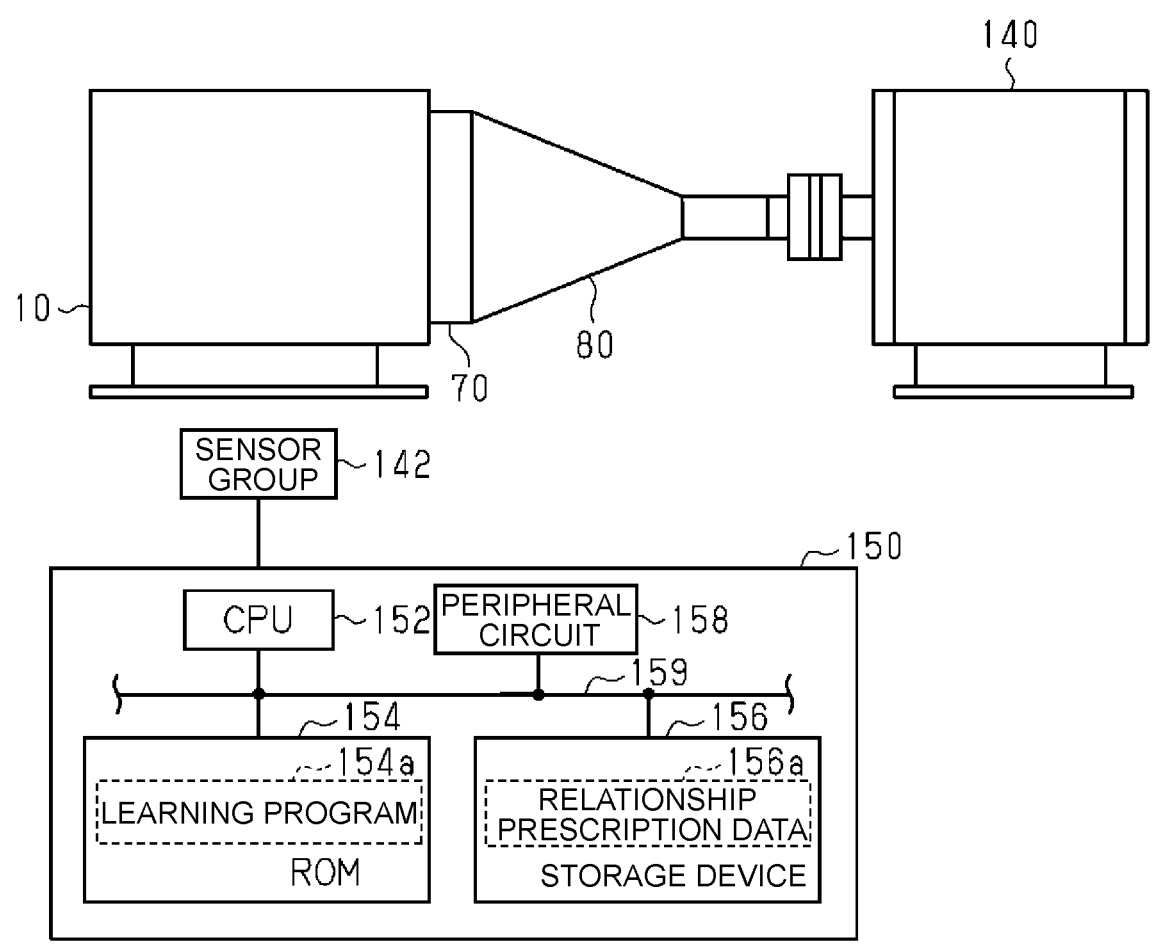
FIG. 3 illustrates a system that generates map data according to the embodiment.

FIG. 3 illustrates a system that generates the map data 96b. In the present embodiment, as illustrated in FIG. 3, a dynamometer 140 is mechanically coupled to the crankshaft 32 of the internal combustion engine 10 via the torque converter 70 and the transmission 80. Various state variables during operation of the internal combustion engine 10 are detected by a sensor group 142, and the detection results are input to a generation device 150 which is a computer that generates the map data 96b. The sensor group 142 includes not only the sensors which are mounted on the vehicle VC1 illustrated in FIG. 1, but also a nitrogen concentration sensor that detects the concentration of nitrogen in exhaust discharged to the exhaust passage 36, an unburned fuel concentration sensor that detects the concentration of unburned fuel in the exhaust, and a particulate matter (PM) sensor that detects the amount of PM in the exhaust. The sensor group 142 also includes a catalyst temperature sensor that detects the temperature (catalyst temperature Tcat) of the catalyst 38, a microphone that detects noise around the internal combustion engine 10, etc.

The generation device 150 includes a CPU 152, a ROM 154, a non-volatile memory (storage device 156) that is electrically rewritable, and a peripheral circuit 158, which can communicate with each other via a local network 159.

Figure 4:
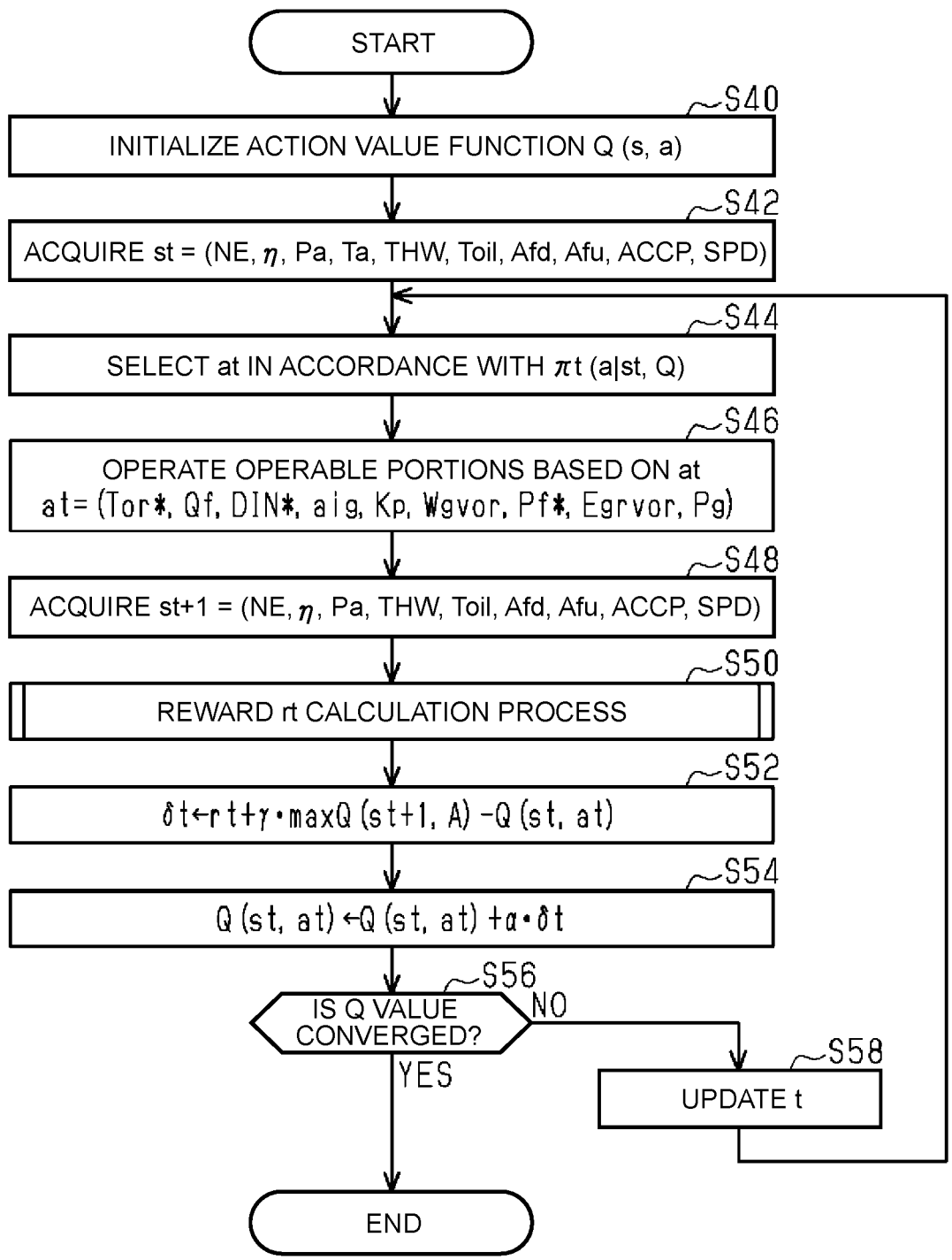
FIG. 4 is a flowchart illustrating the procedures of learning processes according to the embodiment.

FIG. 4 illustrates the procedures of processes executed by the generation device 150. The processes indicated in FIG. 4 are implemented by the CPU 152 executing a learning program 154a stored in the ROM 154.

In the sequence of processes indicated in FIG. 4, the CPU 152 first initializes an action value function Q (s, a) prescribed by relationship prescription data 156a stored in the storage device 156 illustrated in FIG. 3 (S40). The action value function Q is a function of which independent valuables are the state s and the action a and of which an output variable is an expected profit. In the present embodiment, the state s corresponds to ten variables related to the values acquired in the process in S10. Meanwhile, the action a corresponds to the nine operation amounts set through the processes in S12 to S28. That is, in the present embodiment, the state s and the action a are a ten-dimensional vector and a nine-dimensional vector, respectively, but are indicated using the lower-case letters "s" and "a", respectively, for convenience. In addition, the action value function Q (s, a) according to the present embodiment is a table-type function. In the present embodiment, however, the action value function Q (s, a) is defined with only some sets of values obtained by discretizing the values of the variables of the state s and the action a, in order to reduce the number of combinations of the independent variables of the action value function Q (s, a).

Particularly, first, an internal combustion engine that includes operable portions which are similar to those of the internal combustion engine 10 and the operation amounts of which have already been adapted through a related method is caused to operate to specify an action a in each state s. Some of the states s actually detected are selected as values of the input variables prescribed by the map data 96b, and respective actions a for such states are extracted. In the case where a plurality of actions a is extracted for a state, an action actually detected most frequently may be adopted among such actions, for example. Consequently, representative points which are a plurality of sets of the state s and the action a are set. It should be noted, however, that components of the state s and the action a are defined as to which of regions obtained by dividing a region that is equal to or more than a minimum value and equal to or less than a maximum value each of such components belongs. This setting is made in order to compensate for the difference in the displacement between the internal combustion engine, the operation amounts of the operable portions of which have already been adapted through a related method, and the internal combustion engine 10 according to the present embodiment.

In such a state, the CPU 152 determines the range of values that the independent variables of the action value function Q (s, a) may take as a representative point and values obtained by shifting the value of each variable of the action a in the plus direction and the minus direction with respect to the representative point by one unit. For example, in the case where the actually measured value of the EGR opening degree command value Egrvor in a predetermined state s0 is "5", the EGR opening degree command value Egrvor as an independent variable of the action value function Q (s0, a) may take only values "4, 5, 6", even when the EGR opening degree command value Egrvor may take values "0 to 10". That is, the action value function Q (s0, a) is not defined for the state s0 and the EGR opening degree command value Egrvor "1".

Next, the CPU 152 acquires a latest state st (S42). The accelerator operation amount ACCP is generated by the generation device 150, and is not the actual operation amount of the accelerator pedal. That is, in FIG. 3, the accelerator operation amount ACCP is simulatively generated as a variable related to the state of the vehicle, in order to simulate the state of the vehicle. Meanwhile, the vehicle speed SPD is a value assumed based on the rotational speed NE and the speed ratio of the transmission 80 in the case where the internal combustion engine 10 and the transmission 80 are mounted on the vehicle, and is calculated by the generation device 150.

Next, the CPU 152 selects an action at in accordance with a policy πt prescribed by the relationship prescription data 156a (S44). The action at means an action a selected for the state st. The policy πt maximizes the probability of selecting an action a (greedy action) that maximizes the action value function Q (st, a) in the state st while not setting the possibility of selecting the other actions a to "0". Exploration for an optimum action is enabled when the greedy action is not taken. This is implemented by an ε-greedy action selection method or a soft-max action selection method.

Next, the CPU 152 operates the operable portions based on the action at (S46). Incidentally, the action at designates one of a plurality of regions obtained by dividing a region that is equal to or more than a minimum value and equal to or less than a maximum value as discussed above. In operating the operable portions, a value corresponding to the median of the region designated by the action at is adopted. Here, a value obtained through an exponential moving average process of the preceding operation amount and an operation amount determined from the action at may be used as the current operation amount, rather than directly using the action at as the operation amount. The CPU 152 acquires a latest state st+1 (S48). Next, the CPU 152 calculates a reward rt with the action at (S50).

Figure 5:
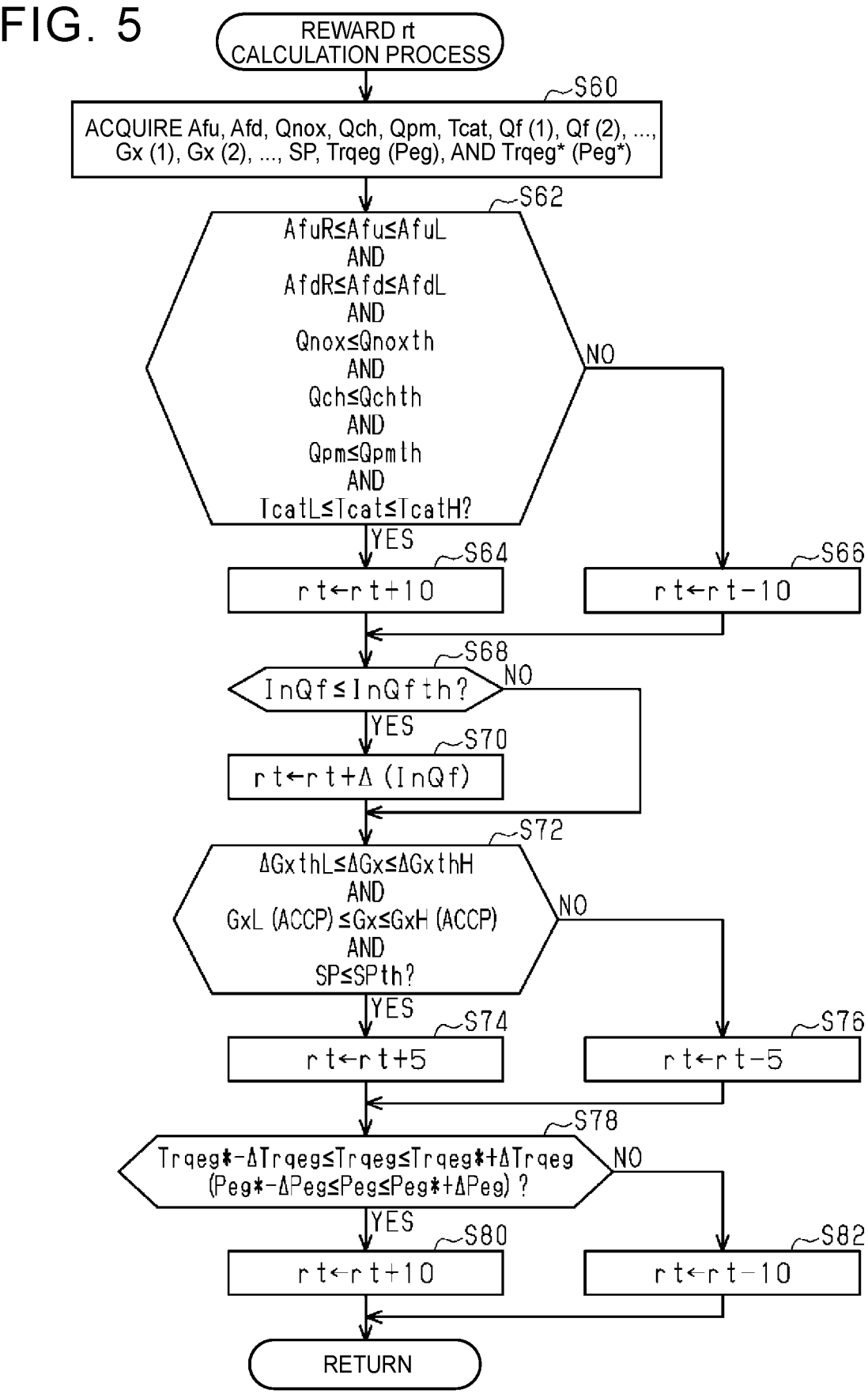
FIG. 5 is a flowchart illustrating the details of a part of the learning processes according to the embodiment.

FIG. 5 illustrates the details of the process in S50. In the sequence of processes indicated in FIG. 5, the CPU 152 first acquires a simulative state of the vehicle, including the state of the internal combustion engine 10, based on detection values from the sensor group 142 (S60). Particularly, the CPU 152 acquires the upstream-side detection value Afu, the downstream-side detection value Afd, an NOx amount Qnox of NOx in the exhaust which is based on a detection value from the nitrogen concentration sensor, an unburned fuel amount Qch of unburned fuel in the exhaust which is based on a detection value from the unburned fuel concentration sensor, a particulate matter (PM) amount Qpm of PM in the exhaust which is based on a detection value from the PM sensor, and the catalyst temperature Tcat which is detected by the catalyst temperature sensor. The CPU 152 also acquires required injection amounts Qf (1), Qf (2), . . . and front-rear accelerations Gx (1), Gx (2), . . . of the vehicle. Values with different numerals in the parentheses indicate that such values are taken at different sampling timings. That is, the required injection amounts Qf (1), Qf (2), . . . are chronological data on the required injection amount Qf, and the front-rear accelerations Gx (1), Gx (2), . . . are chronological data on the front-rear acceleration Gx. The chronological data include values sampled during a period since the preceding execution timing until the current execution timing of the processes in FIG. 5. The front-rear acceleration Gx is a front-rear acceleration assumed to act on the vehicle in the case where the internal combustion engine 10 etc. is mounted on the vehicle, and is calculated by the CPU 152 based on load torque etc. of the dynamometer 140. The CPU 152 also acquires a sound pressure SP detected by a microphone, torque (engine torque Trqeg) of the internal combustion engine 10 which is grasped from load torque generated by the dynamometer 140 and the speed ratio of the transmission 80, and a required value (required engine torque value Trqeg*) thereof. It should be noted, however, that an engine output Peg, which is the product of the engine torque Trqeg and the rotational speed NE, and a required value (required engine output value Peg*) thereof may be acquired in place of the engine torque Trqeg and the required engine torque value Trqeg*. The required engine torque value Trqeg* is set in accordance with the accelerator operation amount ACCP.

Next, the CPU 152 sets a reward based on the viewpoint of the exhaust characteristics through the processes in S62 to S66. That is, the CPU 152 first determines whether the logical product of the following conditions (1) to (6) is true (S62). This process determines whether the exhaust characteristics correspond to predetermined characteristics.

Condition (1): the upstream-side detection value Afu is equal to or more than a rich-side upper limit value AfuR and equal to or less than a lean-side upper limit value AfuL. The rich-side upper limit value AfuR is a value on the rich side with respect to the theoretical air-fuel ratio. The lean-side upper limit value AfuL is a value on the lean side with respect to the theoretical air-fuel ratio.

Condition (2): the downstream-side detection value Afd is equal to or more than a rich-side upper limit value AfdR and equal to or less than a lean-side upper limit value AfdL. The rich-side upper limit value AfdR is a value on the rich side with respect to the theoretical air-fuel ratio. The lean-side upper limit value AfdL is a value on the lean side with respect to the theoretical air-fuel ratio.

Condition (3): the NOx amount Qnox is equal to or less than a predetermined amount Qnoxth.

Condition (4): the unburned fuel amount Qch is equal to or less than a predetermined amount Qchth.

Condition (5): the PM amount Qpm is equal to or less than a predetermined amount Qpmth.

Condition (6): the catalyst temperature Tcat is equal to or more than a lower limit temperature TcatL and equal to or less than an upper limit temperature TcatH.

In the case where it is determined that the logical product of the conditions (1) to (6) is true (S62: YES), the CPU 152 considers that the exhaust characteristics correspond to the target predetermined characteristics, and adds "10" to the reward rt (S64). In the case where it is determined that the logical product described above is false, on the contrary, the CPU 152 adds "−10" to the reward rt (S66). This corresponds to giving a negative reward. In other words, it corresponds to imposing a penalty. Incidentally, the initial value of the reward rt is set to zero each time the sequence of processes indicated in FIG. 5 is started periodically.

In the case where the process in S64 or S66 is completed, the CPU 152 calculates a reward based on the viewpoint of the fuel consumption rate through the processes in S68 and S70. That is, the CPU 152 determines whether an integrated value InQf of the required injection amounts Qf (1), Qf (2), . . . which are acquired in the process in S60 is equal to or less than a predetermined value InQfth (S68). In the case where it is determined that the integrated value InQf is equal to or less than the predetermined value InQfth (S68: YES), the CPU 152 adds a positive predetermined amount Δ to the reward rt (S70). The predetermined amount Δ has a large value in the case where the integrated value InQf is small compared to the case where the integrated value InQf is large.

In the case where the process in S70 is completed or in the case where a negative determination is made in the process in S68, the CPU 152 calculates a reward based on the viewpoint of the drivability through the processes in S72 to S76. That is, the CPU 152 first determines whether the logical product of the following conditions (7) to (9) is true (S72).

Condition (7): a variation amount ΔGx of the front-rear acceleration Gx per predetermined period is equal to or more than a lower limit variation amount ΔGxthL and equal to or less than an upper limit variation amount ΔGxthH.

Condition (8): the front-rear acceleration Gx is equal to or more than a lower limit acceleration GxL and equal to or less than an upper limit acceleration GxH. The lower limit acceleration GxL and the upper limit acceleration GxH are variably set in accordance with the accelerator operation amount ACCP.

Condition (9): the sound pressure SP is equal to or less than a predetermined value SPth.

In the case where it is determined that the logical product of the conditions (7) to (9) is true (S72: YES), the CPU 152 considers that the drivability meets a predetermined criterion, and adds "5" to the reward rt (S74). In the case where it is determined that the logical product described above is false (S72: NO), on the contrary, the CPU 152 adds "−5" to the reward rt (S76).

In the case where the process in S74 or S76 is completed, the CPU 152 determines whether the absolute value of the difference between the engine torque Trqeg and the required engine torque value Trqeg* is equal to or less than a predetermined amount ΔTrqeg (S78). In the case where the engine output Peg is acquired in the process in S60, it is determined in the process in S78 whether the absolute value of the difference between the engine output Peg and the required engine output value Peg*, rather than the absolute value of the difference between the engine torque Trqeg and the required engine torque value Trqeg*, is equal to or less than a predetermined amount ΔPeg.

In the case where an affirmative determination is made in the process in S78, the CPU 152 adds "10" to the reward rt (S80). In the case where a negative determination is made, on the other hand, the CPU 152 adds "−10" to the reward rt (S82).

In the case where the process in S80 or S82 is completed, the CPU 152 completes the process in S50 in FIG. 4. Next, the CPU 152 calculates an error δt (S52), in order to calculate an update amount for updating the value of an action value function Q (st, at), which is the action value function Q (s, a) with the state st and the action at. In the present embodiment, an off-policy TD method is used. That is, the error δt is calculated, using a reduction rate γ, as a value obtained by subtracting the action value function Q (st, at) from the sum of a value obtained by multiplying the maximum value of an action value function Q (st+1, A) by the reduction rate γ and the reward rt. "A" means a set of actions a. Next, the CPU 152 updates the action value function Q (st, at) (S54) by adding a value obtained by multiplying the error δt by a learning rate α to the action value function Q (st, at). That is, a value of the action value function Q (s, a) which is prescribed by the relationship prescription data 156a and which has the state st and the action at as the independent variables is varied by "α·δt". The processes in S52 and S54 are implemented by executing an execution command, in the learning program 154a, for updating the action value function Q using update mapping, to which the reward rt, the state st, and the action at are input and which outputs an updated action value function Q. This update mapping updates the relationship between the values acquired in the process in S10 and the operation amounts selected in accordance with the process in S44, which is prescribed by the relationship prescription data 156a, so as to increase an expected profit. This is because the action value function Q (st, at) is updated so as to derive a value that expresses the actual expected profit more precisely.

Next, the CPU 152 determines whether the value of the action value function Q is converged for each independent variable (S56). In the case where it is determined that the value is not converged (S56: NO), the CPU 152 updates t such that the state st+1 which is acquired in the process in S48 corresponds to the state st (S58), and returns to the process in S44. In the case where it is determined that the value is converged (S56: YES), on the contrary, the CPU 152 temporarily ends the sequence of processes indicated in FIG. 4.

Figure 6:
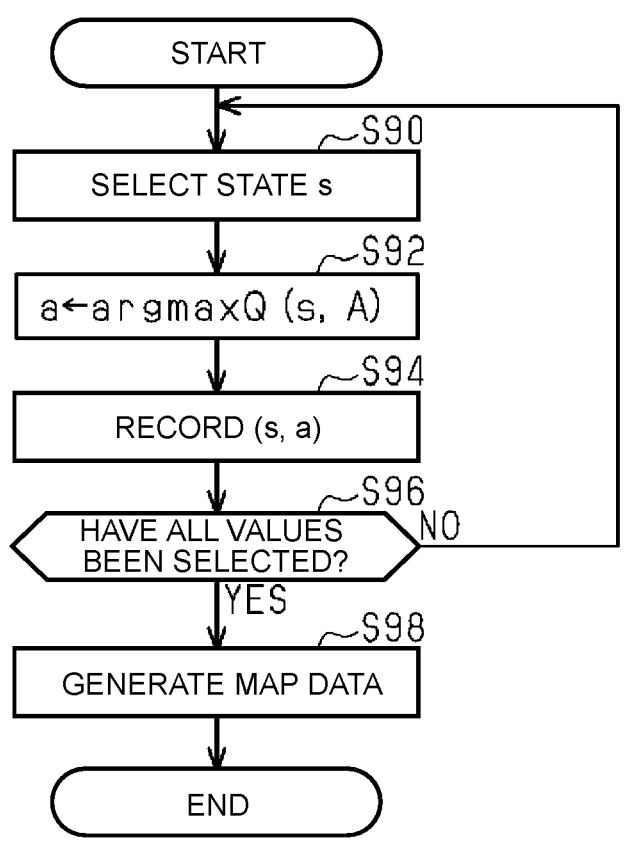
FIG. 6 is a flowchart illustrating the procedures of processes of generating the map data according to the embodiment.

FIG. 6 illustrates the procedures of processes of generating the map data 96b based on the action value function Q which is learned through the processes in FIG. 4, particularly, among the processes executed by the generation device 150. The processes indicated in FIG. 6 are implemented by the CPU 152 executing the learning program 154a stored in the ROM 154.

In the sequence of processes indicated in FIG. 6, the CPU 152 first selects one state s (S90). Next, the CPU 152 selects an action a that maximizes the value of the action value function Q from the action value function Q (s, A) corresponding to the state s (S92). That is, an action a is selected through a greedy policy. Next, the CPU 152 causes the storage device 156 to store a set of the state s and the action a (S94).

Next, the CPU 152 determines whether all the values of the input variables of the map data 96b have been selected in the process in S90 (S96). In the case where it is determined that there is any unselected value (S96: NO), the CPU 152 returns to the process in S90. In the case where all the values have been selected (S96: YES), on the contrary, the CPU 152 generates map data 96b (S98) based on the data which are stored in the process in S94. Here, the values of the output variables corresponding to the values of the input variables of the map data 96b for the state s are determined as the corresponding action a.

Figure 7:
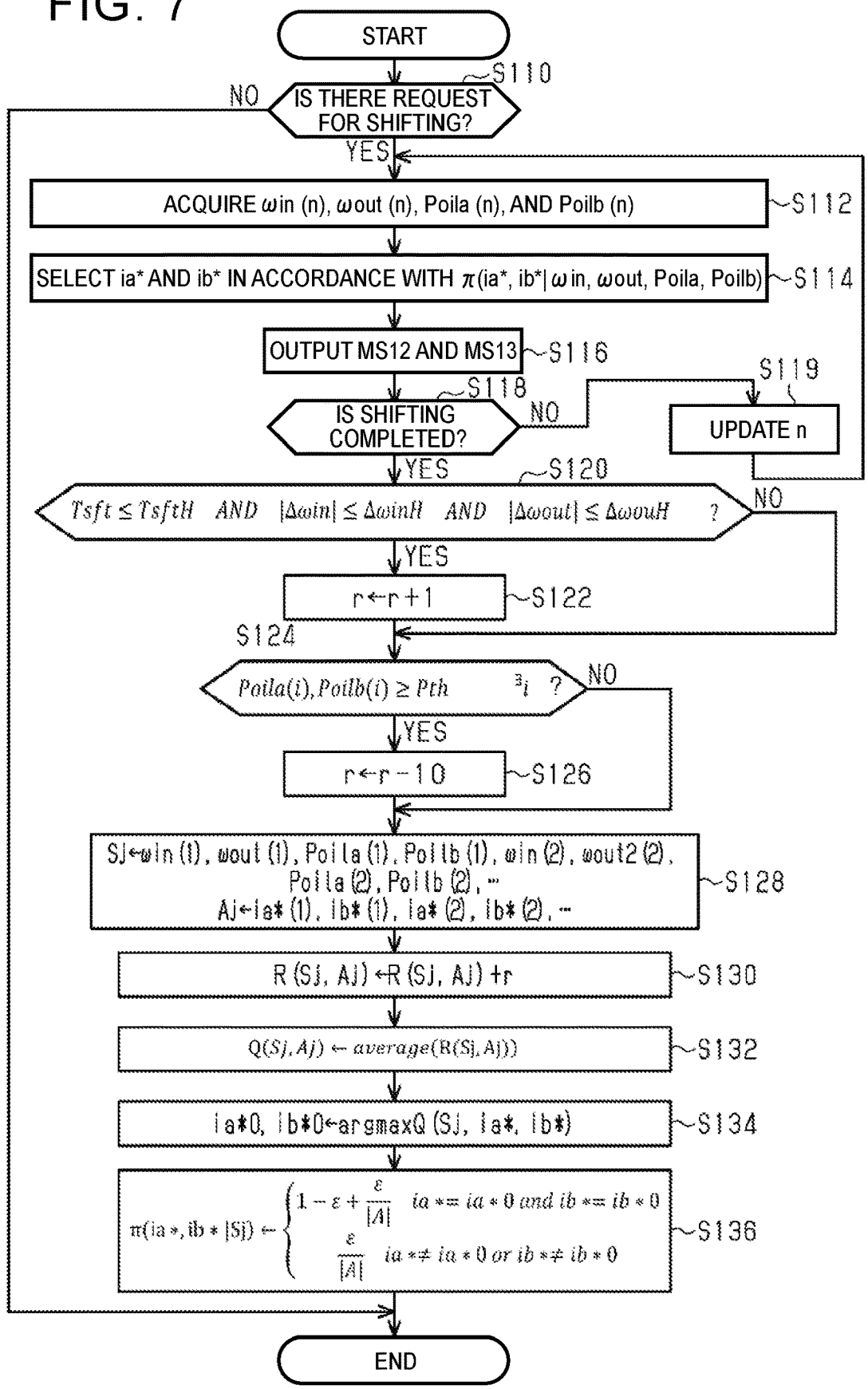
FIG. 7 is a flowchart illustrating the procedures of processes executed by the control device according to the embodiment.

The CPU 152 temporarily ends the sequence of processes indicated in FIG. 6 in the case where the process in S98 is completed. FIG. 7 illustrates the procedures of processes related to an operation of the transmission 80, of the processes which are executed by the control device 90 illustrated in FIG. 1. The processes indicated in FIG. 7 are implemented by the CPU 92 executing the control program 94b and a learning program 94a stored in the ROM 94. FIG. 7 does not illustrate switching among all the speed ratios that can be established by the transmission 80, but illustrates processes for the case where switching from a first speed ratio to a second speed ratio, which are a pair of speed ratios, is performed, by way of example. Here, in order to establish the first speed ratio, the hydraulic pressure Poila is raised to bring a first clutch into the engaged state, and the hydraulic pressure Poilb is lowered to bring a second clutch into the disengaged state. In order to establish the second speed ratio, meanwhile, the hydraulic pressure Poila is lowered to bring the first clutch into the disengaged state, and the hydraulic pressure Poilb is raised to bring the second clutch into the engaged state.

In the sequence of processes indicated in FIG. 7, the CPU 92 first determines whether there is a request for shifting from the first speed ratio to the second speed ratio (S110). In the case where it is determined that there is a request for such shifting (S110: YES), the CPU 92 acquires an input rotational speed ωin (n), an output rotational speed ωout (n), and hydraulic pressures Poila (n) and Poilb (n) (S112). A variable n in "(n)" is the label variable for the timing when the process in S112 is performed. This process is a process of acquiring a state. That is, in the processes in FIG. 7, a state is expressed using a four-dimensional vector with the input rotational speed ωin, the output rotational speed ωout, and the hydraulic pressures Poila and Poilb.

Next, the CPU 92 selects a current command value (solenoid current command value is*) for the solenoid valve 80a and a current command value (solenoid current command value ib*) for the solenoid valve 80b as actions in accordance with the policy π which is prescribed by the relationship prescription data 96a which are stored in the storage device 96 in FIG. 1 (S114). The CPU 152 outputs operation signals MS12 and MS13 (S116), in order to control a current that flows through the solenoid valve 80a to the solenoid current command value ia* and control a current that flows through the solenoid valve 80b to the solenoid current command value ib*.

The CPU 92 determines whether the shifting is completed (S118). In the case where it is determined that the shifting is not completed (S118: NO), the CPU 92 updates the values sampled in the process in S112 to "n−1" (S119), and returns to the process in S112. Consequently, the CPU 152 newly acquires the input rotational speed ωin, the output rotational speed ωout, and the hydraulic pressures Poila and Poilb.

In the case where it is determined that the shifting is completed (S118: YES), on the contrary, the CPU 92 determines whether the logical product of the following conditions (10) to (12) is true (S120).

Condition (10): a speed change time Tsft, which is the time required for switching from the first speed ratio to the second speed ratio, is equal to or less than a predetermined time TsftH. The predetermined time TsftH is set to be equal to or less than an allowable upper limit value for the time required for shifting.

Condition (11): the absolute value of a variation amount Δωin of the input rotational speed ωin per predetermined period is equal to or less than a predetermined input-side value ΔωinH. The predetermined input-side value ΔωinH is set based on an upper limit value that does not give an uncomfortable feeling to the user along with shifting.

Condition (12): the absolute value of a variation amount Δωout of the output rotational speed ωout per predetermined period is equal to or less than a predetermined output-side value ΔωoutH. The predetermined output-side value ΔωoutH is set based on an upper limit value that does not give an uncomfortable feeling to the user along with shifting.

In the case where it is determined that the logical product of the conditions (10) to (12) is true (S120: YES), the CPU 92 adds "1" to the reward r (S122). This means that a positive reward is given in the case where the logical product of the conditions (10) to (12) is true.

In the case where the process in S122 is completed or in the case where a negative determination is made in the process in S120, the CPU 92 determines whether there is any set of sampled values (Poila (i), Poilb (i)) in which both the hydraulic pressure Poila and the hydraulic pressure Poilb are equal to or more than a threshold Pth (S124). The threshold Pth is set to a value that is smaller than a lower limit value at which the clutches are in the engaged state. In the case where it is determined that there is any such set (S124: YES), the CPU 92 adds "−10", which is a negative reward, to the reward r (S126). That is, in the shifting discussed here, it is necessary that one of two clutches, namely a first clutch, the state of which is determined in accordance with the hydraulic pressure Poila, and a second clutch, the state of which is determined in accordance with the hydraulic pressure Poilb, should transition from the engaged state into the disengaged state, and that the other should transition from the disengaged state into the engaged state. Therefore, it is not preferable that both the hydraulic pressure Poila and the hydraulic pressure Poilb are high at the same time.

In the case where the process in S126 is completed or in the case where a negative determination is made in the process in S124, the CPU 92 updates the relationship prescription data 96a which are stored in the storage device 96 illustrated in FIG. 1, in the processes in S128 to S136. In the present embodiment, an e-soft on-policy Monte Carlo method is used.

That is, the CPU 92 first reads chronological data on a set of the input rotational speed ωin, the output rotational speed ωout, and the hydraulic pressures Poila and Poilb, which are the states acquired in the process in S112 during a period of one speed change process, and chronological data on a set of the solenoid current command values ia* and ib*, which are the respective actions corresponding to the states (S128). Here, the states read in the process in S128 are indicated as a state set Sj, and the actions read in the process in S128 are indicated as an action set Aj.

Next, the CPU 92 adds the reward r to a profit R (Sj, Aj) which is determined by a set of each state and the corresponding action read in the process in S128 (S130). The initial value of the profit R may be the initial value of the corresponding action value function Q. Next, the profit R (Sj, Aj) which is determined by a set of each state and the corresponding action read in the process in S128 is averaged and substituted into the corresponding action value function Q (Sj, Aj) (S132). The averaging may be a process of dividing the profit R, which is calculated in the process in S130, by a number obtained by adding a predetermined number to the number of times the process in S130 is performed.

Next, the CPU 92 substitutes the solenoid current command values ia* and ib* with the maximum value, of the action value function Q (Sj, ia*, ib*) corresponding to each state read in the process in S128, into solenoid current command values ia0* and ib0* (S134). While the solenoid current command values ia0* and ib0* have different values in accordance with the type of the state read in the process in S128, the solenoid current command values ia0* and ib0* are indicated by the same symbol for simple notation.

Next, the CPU 92 updates a policy π (ia*, ib*|Sj) corresponding to each state read in the process in S128 (S136). That is, when the total number of actions is "|A|", the probability of selecting the solenoid current command values ia0* and ib0* corresponding to the action selected in S134 is "1−ε+ε/|A|". In addition, the probability of selecting each of the "|A|−1" actions other than the solenoid current command values ia0* and ib0* is "ε/|A|".

The CPU 92 temporarily ends the sequence of processes indicated in FIG. 7 in the case where the process in S136 is completed or in the case where a negative determination is made in the process in S110. In FIG. 7, the processes in S110 to S119 are processes implemented by executing the control program 94b, and the processes in S120 to S136 are processes implemented by executing the learning program 94a.

Incidentally, the relationship prescription data 96a which are stored in the storage device 96 are data for which learning has been performed to some degree in advance in the system illustrated in FIG. 3 through processes that are similar to those in FIG. 7. In reinforcement learning performed by the system illustrated in FIG. 3, "e" may be set to a large value or the threshold Pth may be set to a large value compared to after being stored in the storage device 96. In the case where the threshold Pth is set to a large value, it is desirable that the process in S124 should be executed before the process in S118 so that a large negative reward is given with the learning ended in the case where an affirmative determination is made in the process in S124.

The functions and the effects of the present embodiment will be described. In the system illustrated in FIG. 3, the CPU 152 learns the action value function Q through reinforcement learning. In the case where the value of the action value function Q is converged, operation amounts that are appropriate to meet requirements for the fuel consumption rate, the exhaust characteristics, and the drivability are learned in a state at each time by selecting an action that maximizes the action value function Q in the state. The CPU 152 selects an action that maximizes the action value function Q for each state to be used as an input variable of the map data 96b, and stores a set of the state and the action in the storage device 156. Next, the CPU 152 generates the map data 96b based on the set of the state and the action which is stored in the storage device 156. Consequently, appropriate operation amounts that match the state can be set without excessively increasing the number of man-hours spent by an expert.

In the present embodiment, in particular, ten mutually different amounts are used as the state. Therefore, in the case where an expert adapts the values of ten operation amounts corresponding to the state, for example, an adaptation process may be complicated very much because of the large number of dimensions. In the present embodiment, in contrast, the operation amounts can be set by using reinforcement learning while suppressing an increase in the number of man-hours spent by an expert even in the case where the number of dimensions is large.

According to the present embodiment described above, the following functions and effects can be further achieved.

(1) The storage device 96 of the control device 90 stores the map data 96b, rather than the action value function Q etc. related to the operation amounts of the operable portions of the internal combustion engine 10. Consequently, the CPU 92 sets the operation amounts of the operable portions of the internal combustion engine 10 based on map computation performed using the map data 96b. Thus, the computation load can be reduced compared to the case where a process of selecting the action value function Q with the maximum value is executed.

(2) The operation of switching the speed ratio of the transmission 80 is learned through reinforcement learning. Consequently, operation amounts that match the state of the transmission 80 can be set without excessively increasing the number of man-hours spent by an expert.

(3) The storage device 96 of the control device 90 stores the action value function Q etc. related to the operation amount of the transmission 80 as the relationship prescription data 96a, and the action value function Q and the policy π are updated each time an operation to switch the speed ratio is executed. Consequently, the frequency of learning can be increased compared to the case where an update is not performed by the control device 90.

Second Embodiment

A second embodiment will be described below with reference to the drawings, mainly with regard to differences from the first embodiment.

Figure 8:
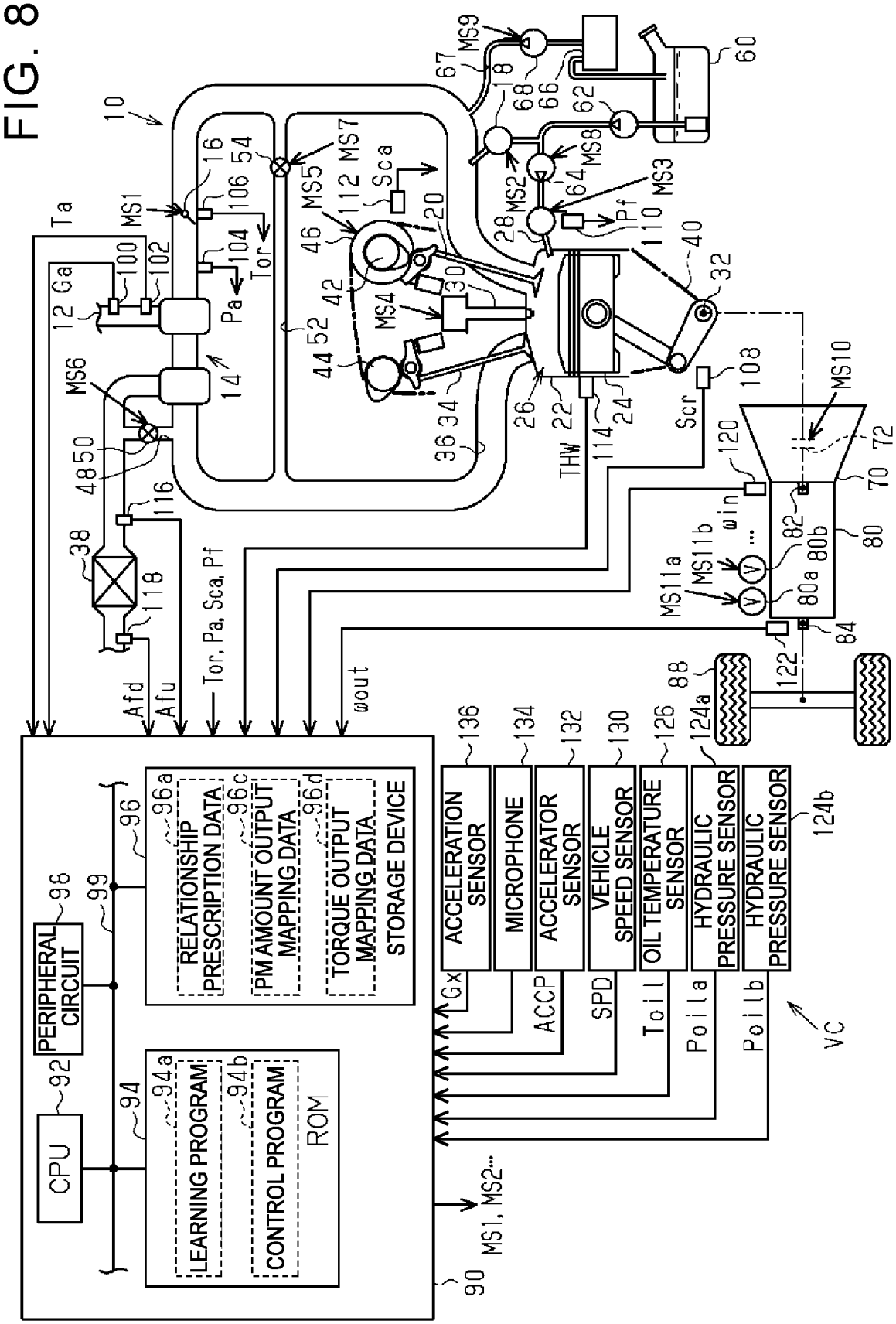
FIG. 8 illustrates a control device and a drive system of a vehicle according to a second embodiment.

FIG. 8 illustrates a control device and a drive system according to the present embodiment. In FIG. 8, members corresponding to the members illustrated in FIG. 1 are given the same reference numerals for convenience. In the present embodiment, as illustrated in FIG. 8, the map data 96b are not provided. Instead, the relationship prescription data 96a according to the present embodiment also include data that prescribe the relationship between the state of the internal combustion engine 10 and the operation amounts of the operable portions of the internal combustion engine 10. The data include the action value function Q etc. generated through the processes in FIG. 4.

The storage device 96 also stores PM amount output mapping data 96c and torque output mapping data 96d. In the present embodiment, in addition, the control device 90 references the sound pressure SP which is detected by a microphone 134 that detects a sound from the drive system and the front-rear acceleration Gx of the vehicle VC1 which is detected by an acceleration sensor 136.

Figure 9:
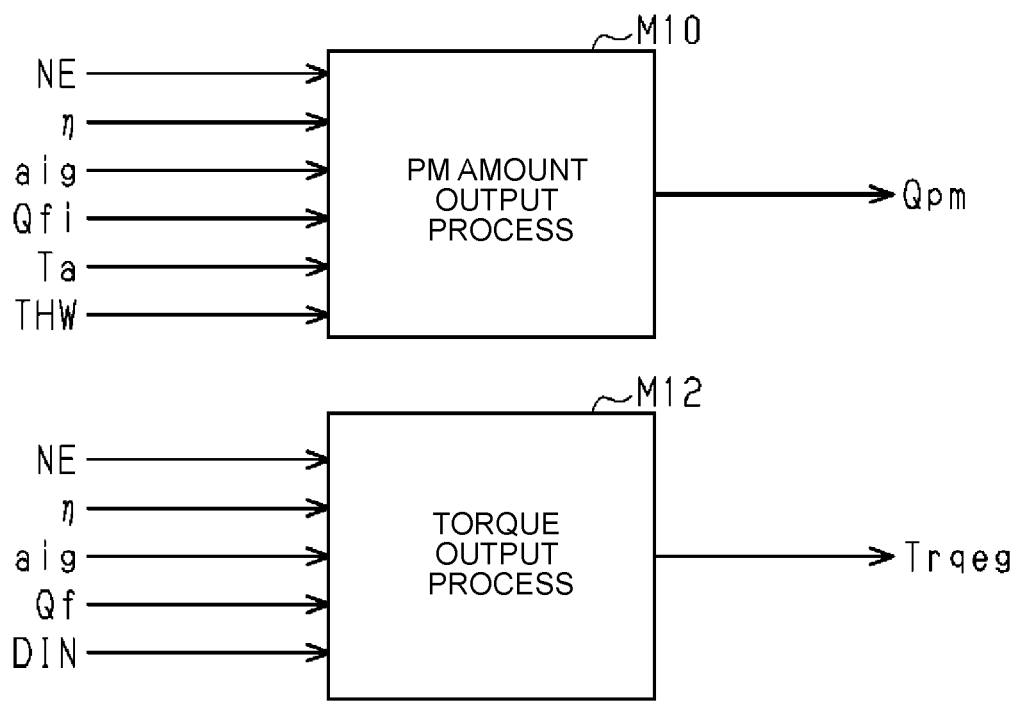
FIG. 9 is a block diagram illustrating processes executed by the control device according to the embodiment.

FIG. 9 illustrates processes implemented by the CPU 92 executing the learning program 94a while utilizing the PM amount output mapping data 96c and the torque output mapping data 96d. A PM amount output process M10 indicated in FIG. 9 is a process of receiving, as inputs, the rotational speed NE, the charging efficiency the ignition timing aig, an injection amount increase amount value Qfi, the intake air temperature Ta, and the water temperature THW and outputting the PM amount Qpm. The injection amount increase amount value Qfi is an excessive portion of the actual injection amount (required injection amount Qf) with respect to an injection amount required to bring the air-fuel ratio of a mixture to be combusted in the combustion chamber 26 to the theoretical air-fuel ratio. It should be noted, however, that the injection amount increase amount value Qfi may take a negative value, in which case the injection amount increase amount value Qfi indicates the amount of shortage of the actual injection amount with respect to the injection amount required to bring the air-fuel ratio of the mixture to the theoretical air-fuel ratio. The PM amount output mapping data 96c are data related to a trained model, such as a neural network, to which the rotational speed NE, the charging efficiency η, the ignition timing aig, the injection amount increase amount value Qfi, the intake air temperature Ta, and the water temperature THW are input and which outputs the PM amount Qpm. Thus, the PM amount output process M10 is a process of calculating the PM amount Qpm using the rotational speed NE, the charging efficiency η, the ignition timing aig, the injection amount increase amount value Qfi, the intake air temperature Ta, and the water temperature THW as inputs to the trained model. The PM amount output mapping data 96c may be learned using, as teacher data, the PM amount Qpm which is acquired in the process in S60 when executing the processes in FIG. 5, for example.

Meanwhile, a torque output process M12 is a process of receiving the rotational speed NE, the charging efficiency η, the ignition timing aig, the required injection amount Qf, and the intake phase difference DIN as inputs and calculating the engine torque Trqeg. The torque output mapping data 96d are data related to a trained model, such as a neural network, to which the rotational speed NE, the charging efficiency η, the ignition timing aig, the required injection amount Qf, and the intake phase difference DIN are input and which outputs the engine torque Trqeg. Thus, the torque output process M12 is a process of calculating the engine torque Trqeg using the rotational speed NE, the charging efficiency η, the ignition timing aig, the required injection amount Qf, and the intake phase difference DIN as inputs to the trained model. The torque output mapping data 96d may be learned using, as teacher data, the engine torque Trqeg which is acquired in the process in S60 when executing the processes in FIG. 5, for example.

Figure 10:
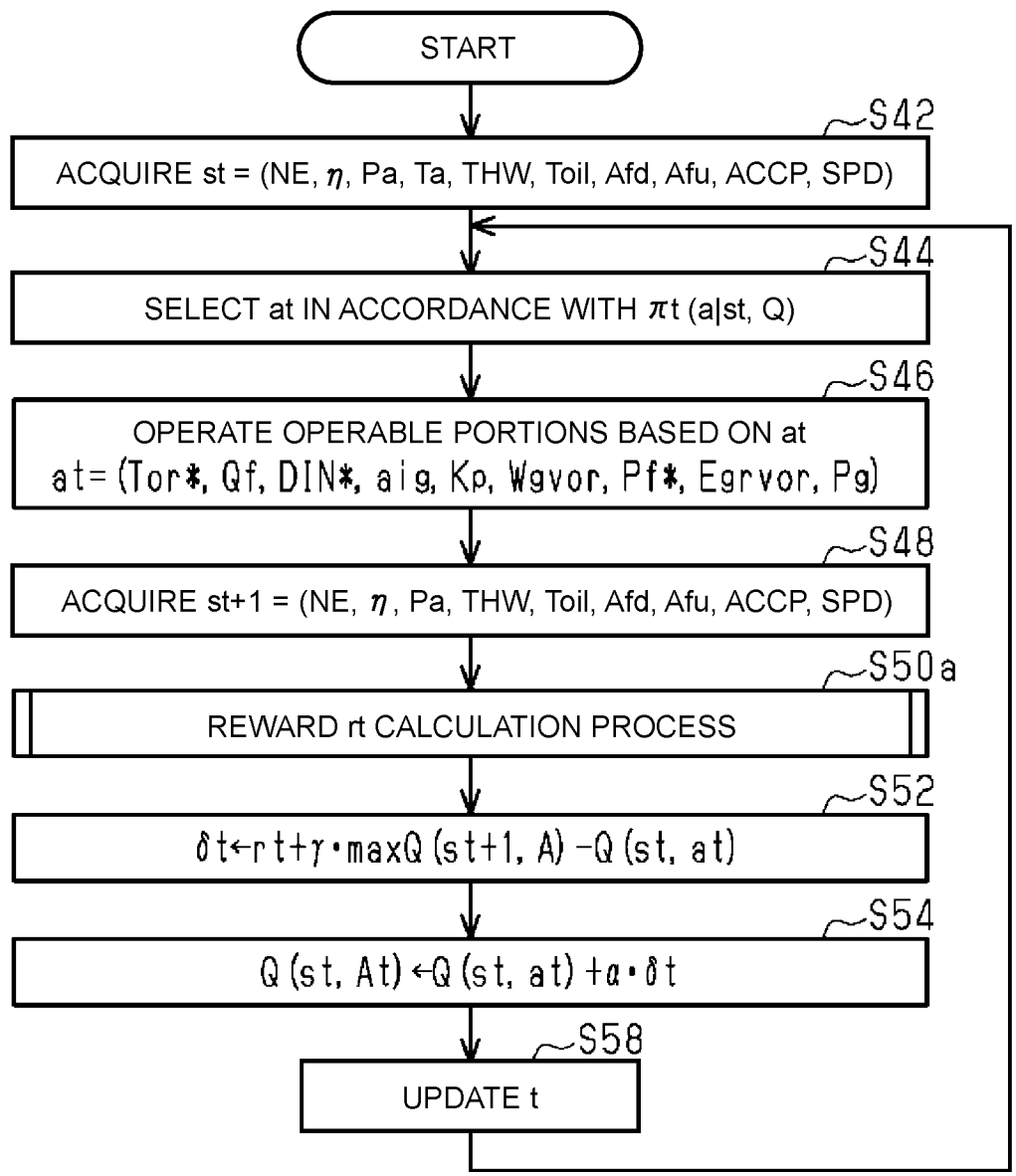
FIG. 10 is a flowchart illustrating the procedures of processes executed by the control device according to the embodiment.

FIG. 10 illustrates the procedures of processes related to an operation of the operable portions of the internal combustion engine 10 by the control device 90 according to the present embodiment. The processes indicated in FIG. 10 are implemented by the CPU 92 executing the control program 94b and the learning program 94a stored in the ROM 94 on condition that there occurs a request to start the internal combustion engine 10, for example. In FIG. 10, processes corresponding to the processes indicated in FIG. 4 are given the same step numbers for convenience.

Figure 11:
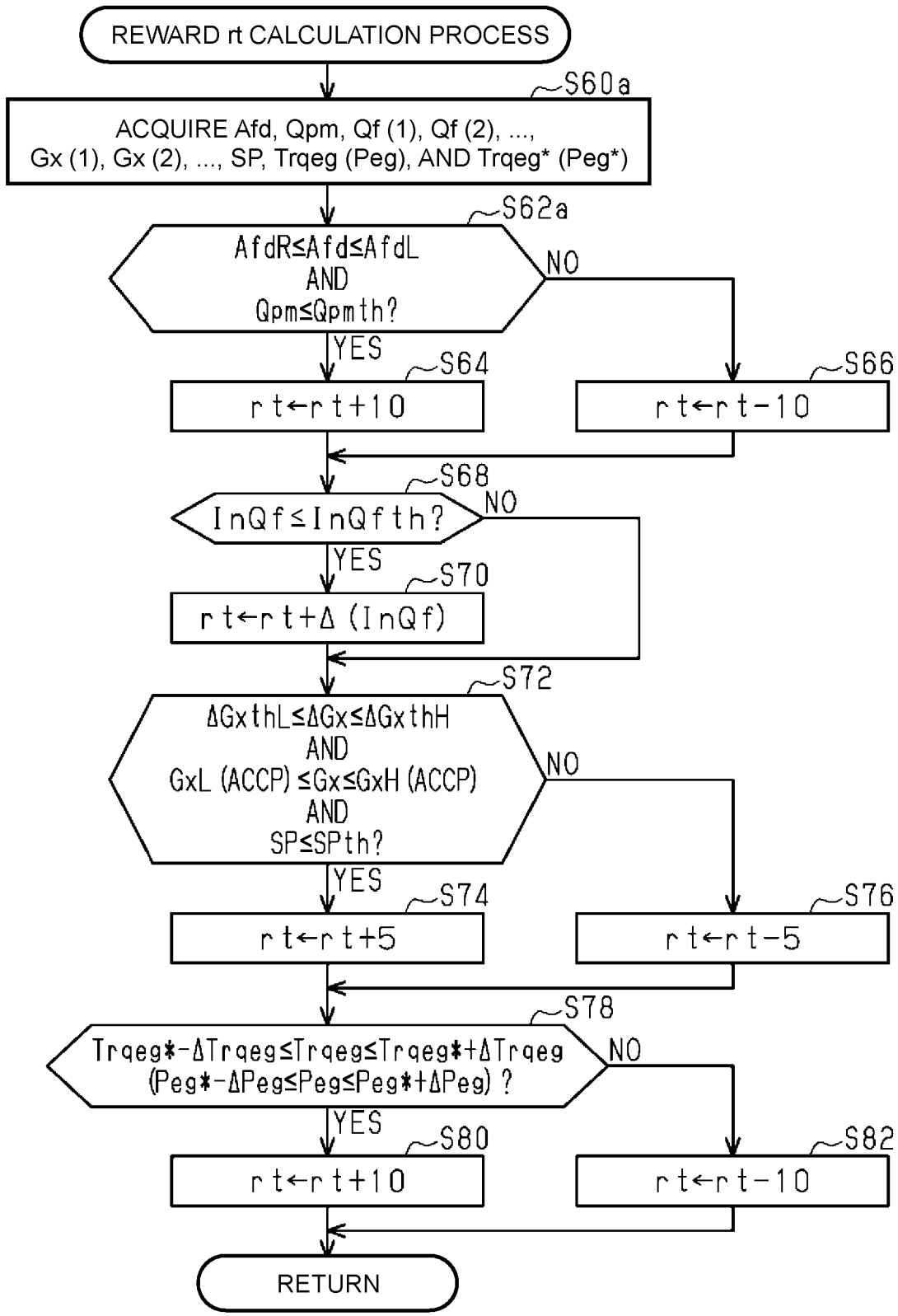
FIG. 11 is a flowchart illustrating the procedures of processes executed by the control device according to the embodiment.

In the sequence of processes indicated in FIG. 10, the CPU 92 first executes processes that are similar to the processes in S42 to S48 indicated in FIG. 4, and thereafter calculates a reward rt (S50a). FIG. 11 illustrates the details of the process in S50a. In FIG. 11, processes corresponding to the processes indicated in FIG. 5 are given the same step numbers for convenience.

In the sequence of processes indicated in FIG. 11, the CPU 92 first acquires the values of variables that are required to calculate the reward rt (S60a). Particularly, the CPU 92 acquires the downstream-side detection value Afd, the PM amount Qpm, chronological data on the required injection amount Qf, chronological data on the front-rear acceleration Gx, the sound pressure SP, the engine torque Trqeg (engine output Peg), and the required engine torque value Trqeg* (required engine output value Peg*). The engine output Peg can be calculated by multiplying the engine torque Trqeg by the rotational speed NE.

Next, the CPU 92 determines whether the logical product of the conditions (2) and (5) is true (S62a). In the case where it is determined that the logical product is true (S62a: YES), the CPU 92 proceeds to the process in S64. In the case where it is determined that the logical product is false (S62a: NO), on the other hand, the CPU 92 proceeds the process in S66. In the case where the process in S64 or S66 is completed, the CPU 92 executes the processes in S68 to S82, and completes the process in S50a in FIG. 10.

Returning FIG. 10, in the case where the process in S50a is completed, the CPU 92 executes the processes in S52 to S54 and S58, and returns to the process in S44. Incidentally, the processes in S42 to S48 are implemented by executing execution commands prescribed by the control program 94b, and the processes in S50a, S52 to S54, and S58 are implemented by executing execution commands prescribed by the learning program 94a.

The policy π in the processes in FIG. 10 may have a high probability of selecting a greedy action compared to the policy π in the processes in FIG. 3. With the present embodiment described above, the action value function Q related to the operation amounts of the operable portions of the internal combustion engine 10 is also updated by the control device 90, and thus the frequency of learning can be increased compared to the case where the action value function Q is not updated thereby.

Third Embodiment

A third embodiment will be described below with reference to the drawings, mainly with regard to differences from the second embodiment.

In the present embodiment, the policy π is directly updated without using an action value function. Particularly, in the present embodiment, the policy π is multivariate Gaussian distribution which determines the probability that each operation amount that determines an action may take. An average value μ (1) of the multivariate Gaussian distribution indicates the average value of the throttle opening degree command value Tor*. An average value μ (2) indicates the average value of the required injection amount Qf. An average value μ (3) indicates the average value of the intake phase difference command value DIN*. An average value μ (4) indicates the average value of the ignition timing aig. An average value μ (5) indicates the average value of the injection distribution ratio Kp. In addition, an average value μ (6) indicates the average value of the WGV opening degree command value Wgvor. An average value μ (7) indicates the average value of the fuel pressure command value Pf*. An average value μ (8) indicates the average value of the EGR opening degree command value Egrvor. An average value μ (9) indicates the average value of the purge operation amount Pg. In the present embodiment, in addition, the covariance matrix of the multivariate Gaussian distribution is a diagonal matrix, and respective variances σ (i) corresponding to the average values σ (i) may take different values.

Figure 12:
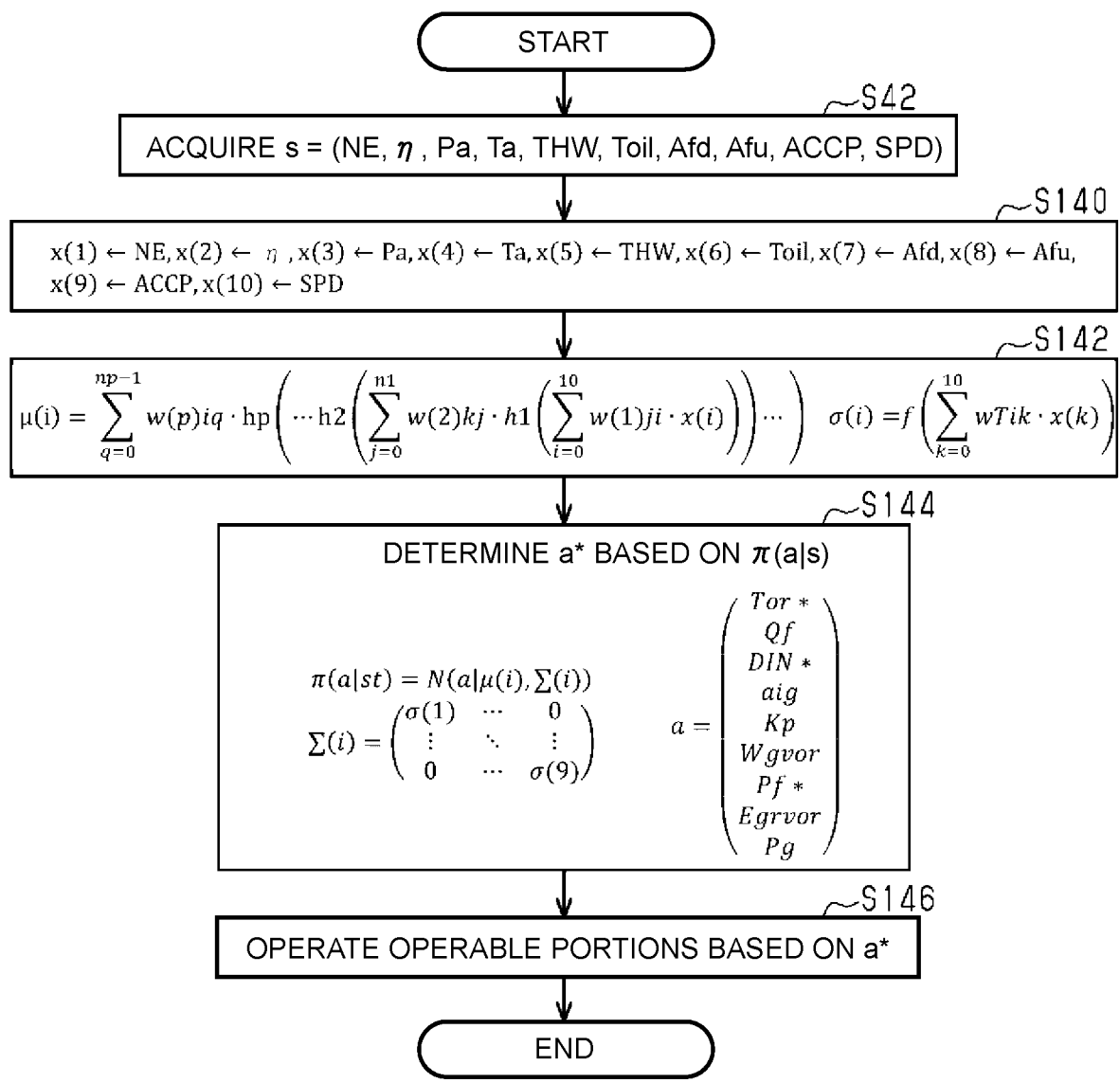
FIG. 12 is a flowchart illustrating the procedures of processes executed by a control device according to a third embodiment.

FIG. 12 illustrates the procedures of processes related to an operation of the operable portions of the internal combustion engine 10 according to the present embodiment. The processes indicated in FIG. 12 are implemented by the CPU 92 executing the control program 94b, which is stored in the ROM 94, repeatedly at predetermined periods, for example. In FIG. 12, processes corresponding to the processes indicated in FIG. 4 are given the same step numbers for convenience.

In the sequence of processes indicated in FIG. 12, the CPU 92 first executes the process in S42 as in the processes in FIG. 4. While the state is indicated as "s" in FIG. 12, which is different from "st" which is used in FIG. 4, they are merely notational variants.

Next, the CPU 92 substitutes the state s, which is acquired in the process in S42, into input variables x (1) to x (10) of a function approximator for setting the policy π (S140). Particularly, the CPU 92 substitutes the rotational speed NE into the input variable x (1), the charging efficiency into the input variable x (2), the boost pressure Pa into the input variable x (3), the intake air temperature Ta into the input variable x (4), and the water temperature THW into the input variable x (5). The CPU 92 also substitutes the oil temperature Toil into the input variable x (6), the downstream-side detection value Afd into the input variable x (7), the upstream-side detection value Afu into the input variable x (8), the accelerator operation amount ACCP into the input variable x (9), and the vehicle speed SPD into the input variable x (10).

Next, the CPU 92 calculates an average value μ (i) and a variance σ (i) for each of "i=1 to 9" (S142). In the present embodiment, the average value μ (i) is constituted by a neural network which has "p−1" intermediate layers and for which activation functions h1 to hp-1 of the intermediate layers are hyperbolic tangents and an activation function hp of an output layer is a rectified linear unit (ReLU). The ReLU is a function that outputs one of the input and "0" that is not the smaller. If m=1, 2, . . . , p−1, the value of each node in the m-th intermediate layer is generated by inputting the output of linear mapping prescribed by a coefficient w (m) into an activation function hm. n1, n2, . . . , np-1 are the respective numbers of nodes in the first, second, . . . , p−1-th intermediate layers. For example, the value of each node in the first intermediate layer is generated by inputting, into an activation function h1, an output obtained by inputting the input variables x (1) to x (10) into linear mapping prescribed by a coefficient w (1) ji (j=0 to n1, i=0 to 10). Incidentally, wm (1) j0 etc are bias parameters, and the input variable x (0) is defined as "1".

The neural network outputs the average value μ (i) when the output of the activation function hp is input to linear mapping prescribed by a coefficient w (p) iq (i=1 to 9, q=0 to np-1).

In the present embodiment, in addition, the variance σ (i) is the value of a function f obtained by inputting, into the function f, each of values obtained by linearly transforming the input variables x (1) to x (10) using linear mapping prescribed by a coefficient wTik (i=1 to 9, k=1 to 10). In the present embodiment, the ReLU is used as the function f.

Next, the CPU 92 determines an action a* based on the policy π which is defined by the average value μ (i) and the variance σ (i) which are calculated in the process in S142 (S144). Here, the probability of selecting the average value μ (i) is the highest, and the probability of selecting the average value μ (i) is high in the case where the variance σ (i) is low compared to the case where the variance σ (i) is high.

Figure 13:
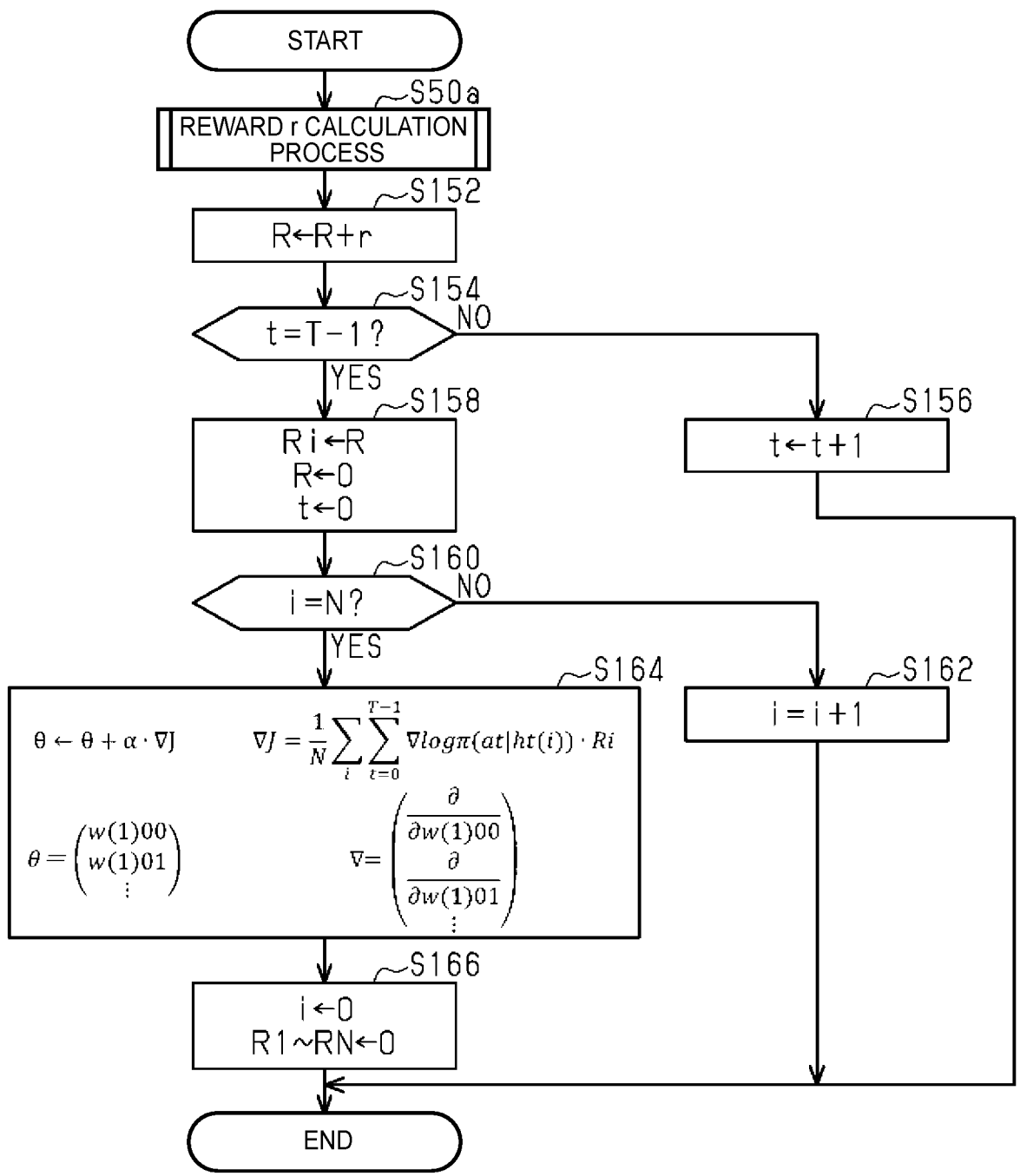
FIG. 13 is a flowchart illustrating the procedures of processes executed by the control device according to the embodiment.

Next, the CPU 92 operates the operable portions of the internal combustion engine 10 based on the action a* which is selected in the process in S144 (S146), and temporarily ends the sequence of processes indicated in FIG. 12. FIG. 13 illustrates the procedures of processes of updating the policy π performed by the control device 90. The processes indicated in FIG. 13 are implemented by the CPU 92 executing the learning program 94a, which is stored in the ROM 94, repeatedly at predetermined periods, for example.

In the sequence of processes indicated in FIG. 13, the CPU 92 first calculates a reward r in the process in S50a. Next, the CPU 92 adds the reward r to the profit R (S152). The CPU 92 determines whether a variable t has reached a predetermined time T−1 (S154). In the case where it is determined that the predetermined time T−1 has not been reached (S154: NO), the CPU 92 increments the variable t (S156).

In the case where it is determined that the predetermined time T−1 has been reached (S154: YES), on the contrary, the CPU 92 substitutes the profit R into a profit Ri, thereafter initializes the profit R, and further initializes the variable t (S158). Next, the CPU 92 determines whether a variable i has reached a predetermined value N (S160). In the case where it is determined that the predetermined value N has not been reached (S160: NO), the CPU 92 increments the variable i (S162).

In the case where it is determined that the predetermined value N has been reached (S160: YES), on the contrary, the CPU 92 updates variables w (1) to w (p) and a coefficient wT, which prescribe the policy π, through a policy gradient method (S164). In FIG. 13, the variables w (1) to w (p) and the coefficient wT which prescribe the policy π are collectively indicated as a parameter θ.

T sets of the state s, the action a, and the reward r with the variable t ranging from 0 to T−1 are defined as a trajectory ht. A probability pθ (ht) is defined as a probability pθ (ht) with which the trajectory ht is obtained in accordance with the policy π which is prescribed by the parameter θ. Here, an integral value of "pθ (ht)·Rt" with respect to the trajectory ht is an expected value (expected profit J) of the profit R (ht), and the parameter θ is updated so as to maximize the expected profit J. This is implemented by determining the update amount for each component of the parameter θ as being proportional to a value obtained by partially differentiating the expected profit J with respect to the component.

The probability pθ (ht) is represented, using the states s0, s1, sT and the actions a0, a1, . . . aT, as pθ (ht)=p(s0)·p(s1|a0)·π(a0|s0)·p(s2|s1, a1)·π(a1|s1) . . . p(sT|sT−1, aT−1)·π(aT−1|sT−1) It should be noted, however, that the initial probability p (s0) is the probability of the state s0, and that the transition probability p (st+1|st, at) is the probability of transition from the state st to the state st+1 at the time of the state st and the action at.

Thus, the partial differential of the expected profit J is represented by the following formula (c1).

$$\nabla J = \nabla \int p\theta(ht) \cdot R(ht) dht \quad \text{(c1)}$$
$$= \int R(ht) p\theta(ht) \nabla \log p\theta(ht) dht$$
$$= \int R(ht) p\theta(ht) \sum_{t=0}^{T-1} \nabla \log \pi(at \mid st) dht$$

The probability pθ (ht) cannot be known. Thus, the integral in the formula (c1) is replaced with an average value with a plurality (a predetermined number N) of trajectories ht.

Consequently, the partial differential coefficient of the expected profit J with respect to each component of the parameter θ is a value obtained by adding, for the predetermined number N of profits Ri, the product of the profit Ri and the sum of the partial differential coefficient of the logarithm of the policy π (at|ht (i)) with respect to the corresponding component of the parameter θ for "t=0 to T−1", and dividing the resulting sum by the predetermined number N.

The CPU 92 uses a value obtained by multiplying the partial differential coefficient of the expected profit J with respect to each component of the parameter θ by the learning rate α as an update amount for the corresponding component of the parameter θ. The processes in S152 to S164 are implemented by executing an execution command, in the learning program 94a which is stored in the ROM 94, to execute update mapping, to which the states s0, s1, . . . , the actions a0, a1, . . . , and the reward r are input and which outputs the updated parameter θ.

In the case where the process in S164 is completed, the CPU 92 initializes the variable i and the profits R1 to RN (S166). The CPU 92 temporarily ends the sequence of processes indicated in FIG. 13 in the case where the process in S156, S162, or S166 is completed.

Incidentally, in executing reinforcement learning for the first time, the initial value of the average value μ (i) may be set as follows, for example. That is, defining the state s and the action a during operation of an internal combustion engine which has the same displacement and the same operable portions as the internal combustion engine 10 and for which control specifications have already been determined as training data, the parameter θ related to the average value μ (i) may be learned so as to reduce the absolute value of the difference between the average value μ (i) and the training data. Meanwhile, the variance σ (i) may be set such that a range of about plus/minus ten percent from the average value μ (i) is explored sufficiently, for example.

In this manner, in the present embodiment, the state and the action which are represented by continuous variables can be handled easily by using a function approximator.

Fourth Embodiment

A fourth embodiment will be described below with reference to the drawings, mainly with regard to differences from the third embodiment. While the vehicle VC1 which includes only the internal combustion engine 10 as a thrust generation device for the vehicle VC1 is indicated in the third embodiment, a series-parallel hybrid vehicle which includes a motor/generator as a thrust generation device in addition to the internal combustion engine 10 is indicated in the present embodiment.

Figure 14:
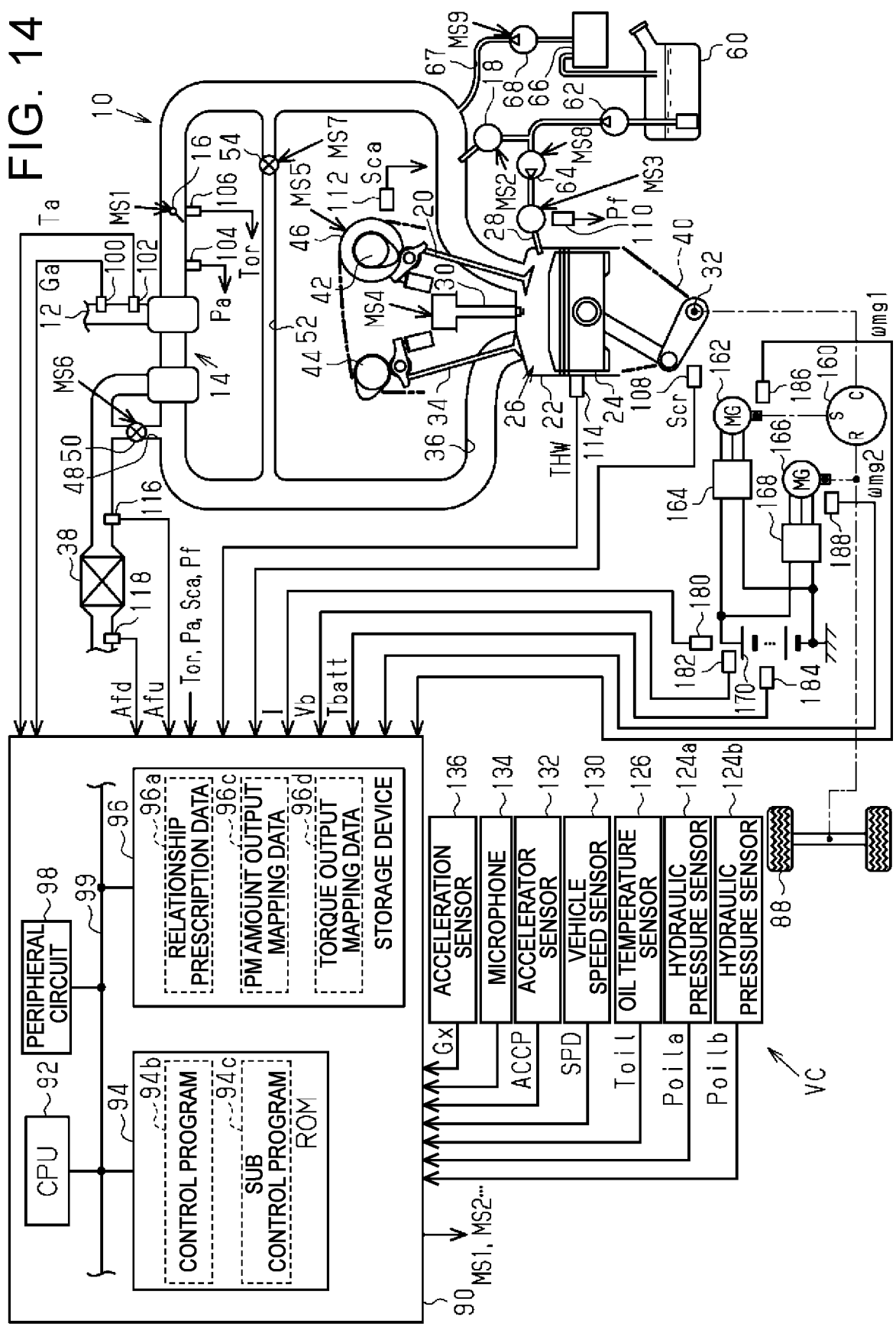
FIG. 14 illustrates a control device and a drive system of a vehicle according to a fourth embodiment.

FIG. 14 illustrates a control device and a drive system according to the present embodiment. In FIG. 14, members corresponding to the members illustrated in FIG. 8 are given the same reference numerals for convenience. As illustrated in the drawing, the crankshaft 32 is mechanically coupled to a carrier (indicated as "C" in the drawing) of a planetary gear mechanism 160 which serves as a power split mechanism. A rotary shaft of a first motor/generator 162 is mechanically coupled to a sun gear (indicated as "S" in the drawing) of the planetary gear mechanism 160. A rotary shaft of a second motor/generator 166 is mechanically coupled to a ring gear (indicated as "R" in the drawing) of the planetary gear mechanism 160. A DC voltage of a battery 170 is converted into an AC voltage by an inverter 164 to be applied to a terminal of the first motor/generator 162. A DC voltage of the battery 170 is converted into an AC voltage by an inverter 168 to be applied to a terminal of the second motor/generator 166.

The control device 90 controls the first motor/generator 162 and the second motor/generator 166, and operates the inverters 164 and 168 in order to control the control amounts (such as torque) thereof. In controlling the control amounts, the control device 90 references a charge/discharge current I of the battery 170 detected by a current sensor 180, a terminal voltage Vb of the battery 170 detected by a voltage sensor 182, and a battery temperature Tbatt detected by a temperature sensor 184. The control device 90 also references a rotational speed (first MG speed ωmg1) of the rotary shaft of the first motor/generator 162 detected by a first speed sensor 186, and a rotational speed (second MG speed ωmg2) of the rotary shaft of the second motor/generator 166 detected by a second speed sensor 188.

Figure 15:
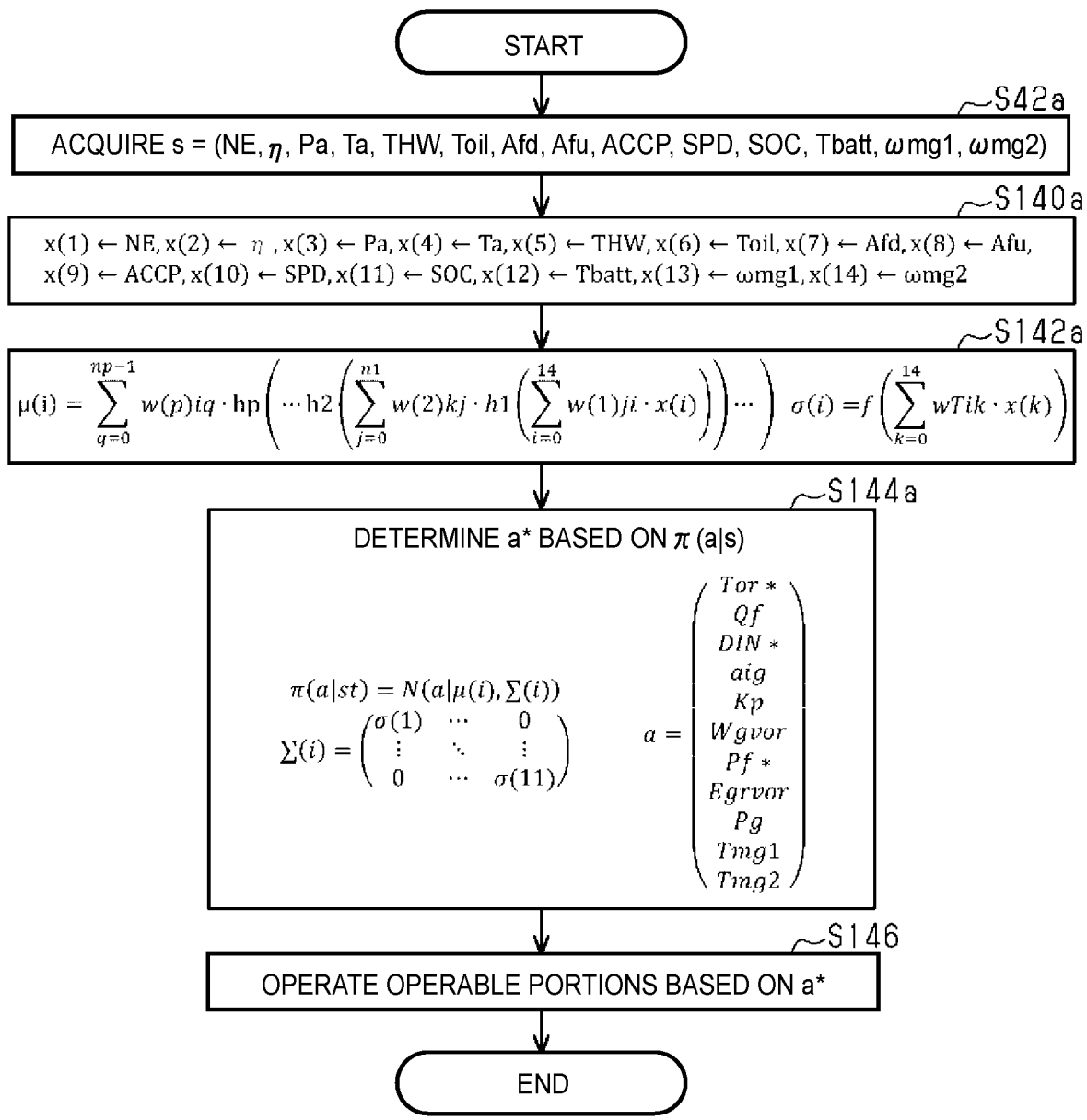
FIG. 15 is a flowchart illustrating the procedures of processes executed by the control device according to the embodiment.

FIG. 15 illustrates the procedures of processes related to an operation of the operable portions of the internal combustion engine 10 and the inverters 164 and 168 by the control device 90. The processes indicated in FIG. 15 are implemented by the CPU 92 executing the control program 94b, which is stored in the ROM 94, repeatedly at predetermined periods, for example. In FIG. 15, processes corresponding to the processes indicated in FIG. 12 are given the same step numbers for convenience.

In the sequence of processes indicated in FIG. 15, the CPU 92 first acquires a state s (S42a). Here, a charging rate SOC of the battery 170, the battery temperature Tbatt, the first MG speed ωmg1, and the second MG speed ωmg2 are acquired in addition to the values of the variables which are acquired in the process in S42. The charging rate SOC is calculated by the CPU 92 based on the relationship between the open-end voltage and the charging rate SOC in accordance with the terminal voltage Vb at the time when the charge/discharge current I is low, and updated in accordance with the charge/discharge current I at each time.

Next, the CPU 92 substitutes the values acquired in the process in S42a into input variables x of a function approximator for determining the average value μ (i) and the variance σ(i) (S140a). The input variables x (1) to x (10) are the same as those used in the process in S140. Meanwhile, the CPU 92 substitutes the charging rate SOC into an input variable x (11), the battery temperature Tbatt into an input variable x (12), the first MG speed ωmg1 into an input variable x (13), and the second MG speed ωmg2 into an input variable x (14).

The CPU 92 calculates the average values μ (1) to μ (11) and the variances σ (1) to σ (11) by substituting the input variables x (1) to x (14) into the function approximator (S142a). The average value μ (10) is the average value of first MG torque Tmg1 which is torque of the first motor/generator 162. The average value μ (11) is the average value of second MG torque Tmg2 which is torque of the second motor/generator 166. The function approximator according to the present embodiment is the same as that used in the process in S142 except for the number of dimensions of the input variables x.

Next, the CPU 92 determines an action a* composed of nine operation amounts of the operable portions of the internal combustion engine 10, the first MG torque Tmg1, and the second MG torque Tmg2 based on the policy π (S144a). The CPU 92 operates the operable portions of the internal combustion engine 10 and the inverters 164 and 168 based on the action a* (S146). The CPU 92 operates the inverter 164 such that torque of the first motor/generator 162 is brought to the first MG torque Tmg1, and operates the inverter 168 such that torque of the second motor/generator 166 is brought to the second MG torque Tmg2. The CPU 92 temporarily ends the sequence of processes indicated in FIG. 15 in the case where the process in S146 is completed.

The CPU 92 updates the parameter θ through processes that are similar to the processes in FIG. 13. It should be noted, however, that the CPU 92 executes the processes indicated in FIG. 16, in place of the process in S50a, as a process of calculating the reward r.

Figure 16:
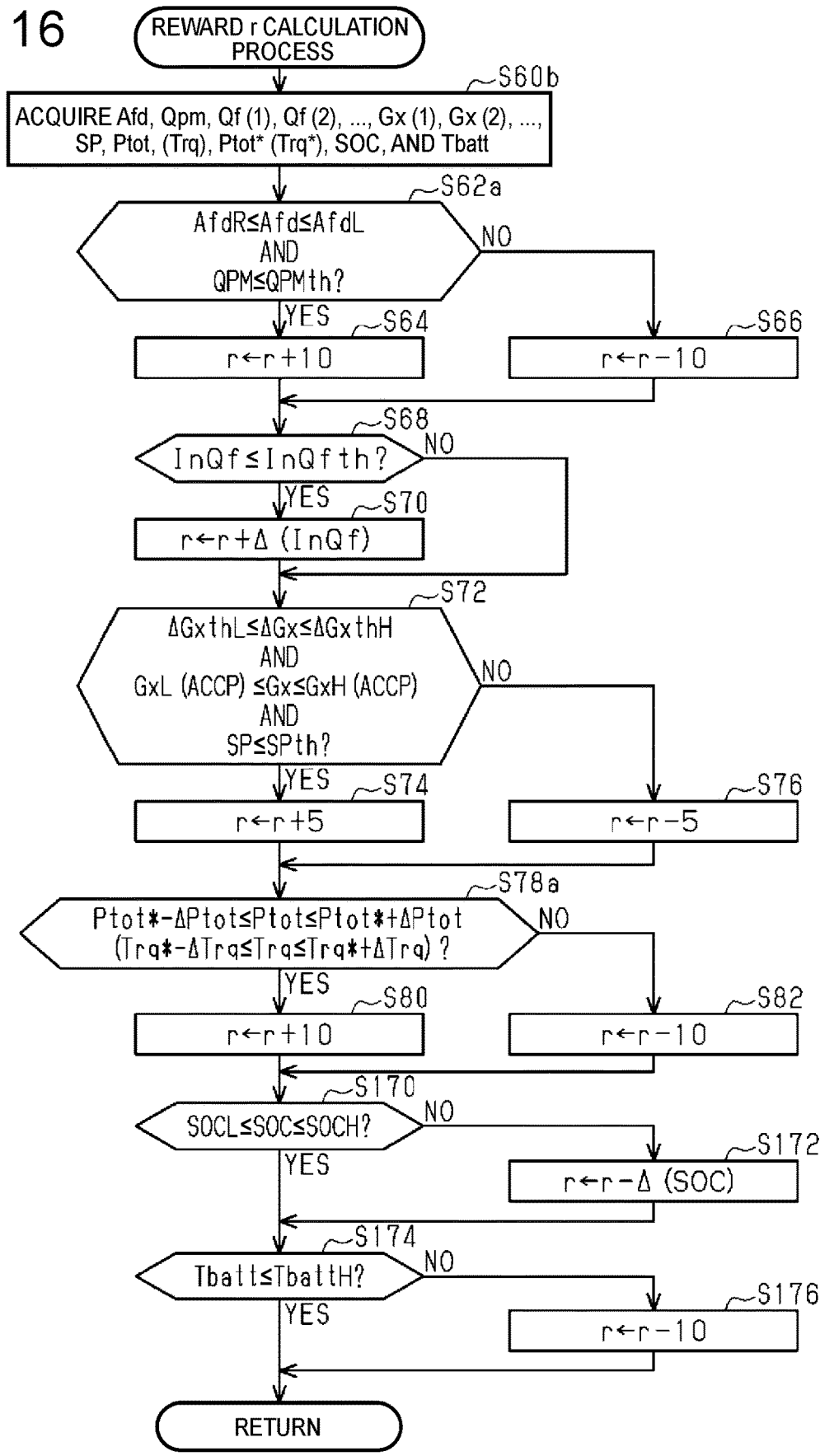
FIG. 16 is a flowchart illustrating the procedures of processes executed by the control device according to the embodiment.

FIG. 16 illustrates the details of the process of calculating the reward r according to the present embodiment. In FIG. 16, processes corresponding to the processes indicated in FIG. 11 are given the same step numbers for convenience.

In the sequence of processes indicated in FIG. 16, the CPU 92 first acquires the values of variables that are used to calculate the reward r (S60b). The CPU 92 acquires a required output value Ptot* (required drive torque value Trq*) of the vehicle VC1, an output Ptot (drive torque Trq), the charging rate SOC, and the battery temperature Tbatt, in addition to the values of the variables acquired in the process in S60a other than the required engine torque value Trqeg* (required engine output value Peg*). The output Ptot is the sum of an output of the internal combustion engine 10, an output of the first motor/generator 162, and an output of the second motor/generator 166. It should be noted, however, that the three outputs include outputs with different signs, unless all of the three outputs are zero, because of the nature of the planetary gear mechanism 160. In addition, the output of the first motor/generator 162 can be calculated by multiplying the first MG torque Tmg1 by the first MG speed ωmg1, for example. Meanwhile, the drive torque Trq can be calculated by converting each of the engine torque Trqeg, the first MG torque Tmg1, and the second MG torque Tmg2 into torque of the drive wheels 88.

After executing the processes in S62a and S64 to S76, the CPU 92 determines whether the absolute value of the difference between the output Ptot and the required output value Ptot* of the vehicle VC1 is equal to or less than a predetermined amount ΔPtot (S78a). In the case where the drive torque Trq and the required drive torque value Trq* are acquired in the process in S60b, it may be determined in the process in S78a whether the absolute value of the difference between the drive torque Trq and the required drive torque value Trq* is equal to or less than a predetermined amount ΔTrq.

In the case where an affirmative determination is made in the process in S78a, the CPU 92 proceeds to the process in S80. In the case where a negative determination is made in the process in S78a, on the other hand, the CPU 92 proceeds to the process in S82. In the case where the process in S80 or S82 is completed, the CPU 92 determines whether the charging rate SOC is equal to or more than a lower limit value SOCL and equal to or less than an upper limit value SOCH (S170). In the case where the charging rate SOC is less than the lower limit value SOCL or more than the upper limit value SOCH (S172: NO), the CPU 92 subtracts a predetermined amount Δ from the reward r in order to give a negative reward (S172). The CPU 92 sets the predetermined amount Δ to a large value in the case where the amount by which the charging rate SOC is less than the lower limit value SOCL is large compared to the case where such an amount is small. Meanwhile, the CPU 92 sets the predetermined amount Δ to a large value in the case where the amount by which the charging rate SOC is more than the upper limit value SOCH is large compared to the case where such an amount is small.

In the case where an affirmative determination is made in the process in S170 or in the case where the process in S172 is completed, the CPU 92 determines whether the battery temperature Tbatt is equal to or less than an upper limit temperature TbattH (S174). In the case where it is determined that the battery temperature Tbatt is more than the upper limit temperature TbattH (S174: NO), the CPU 92 adds "−10" to the reward r (S176).

The CPU 92 temporarily ends the sequence of processes indicated in FIG. 16 in the case where an affirmative determination is made in the process in S174 or in the case where the process in S176 is completed.

Fifth Embodiment

Figure 17:
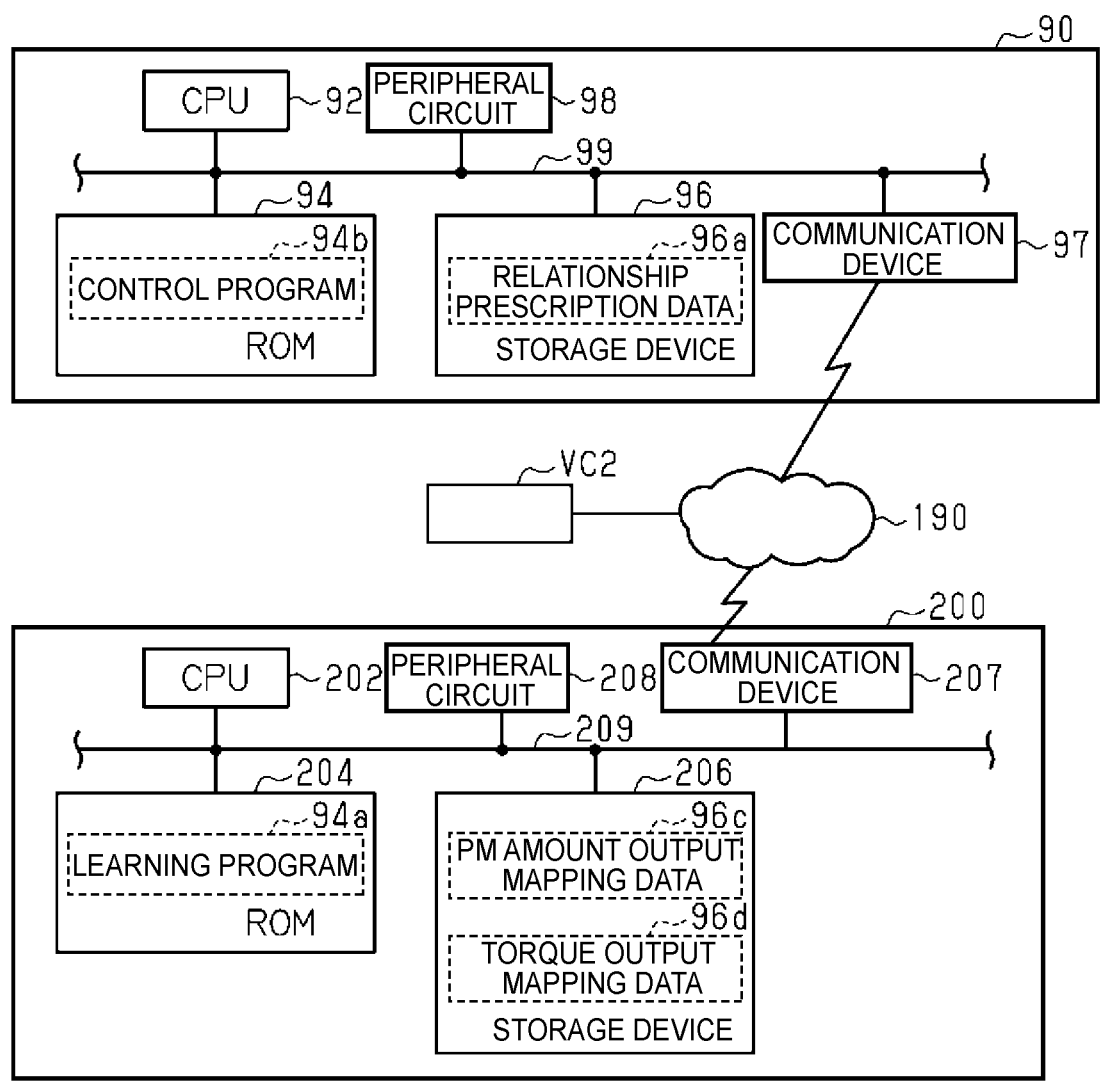
FIG. 17 illustrates the configuration of a system according to a fifth embodiment.

A fifth embodiment will be described below with reference to the drawings, mainly with regard to differences from the fourth embodiment. In the present embodiment, the parameter θ is updated outside the vehicle VC1. FIG. 17 illustrates the configuration of a control system that executes reinforcement learning according to the present embodiment. In FIG. 17, members corresponding to the members illustrated in FIG. 14 are given the same reference numerals for convenience.

The ROM 94 in the control device 90 in the vehicle VC1 illustrated in FIG. 17 stores the control program 94b, but does not store the learning program 94a. Meanwhile, the storage device 96 stores the relationship prescription data 96a, but does not store the PM amount output mapping data 96c or the torque output mapping data 96d. In addition, the control device 90 includes a communication device 97. The communication device 97 is a device that communicates with a data analysis center 200 via a network 190 that is external to the vehicle VC1.

The data analysis center 200 analyzes data transmitted from a plurality of vehicles VC1, VC2, . . . . The data analysis center 200 includes a CPU 202, a ROM 204, a storage device 206, a peripheral circuit 208, and a communication device 207, which can communicate with each other via a local network 209. The ROM 204 stores the learning program 94a. The storage device 206 stores the PM amount output mapping data 96c and the torque output mapping data 96d.

Figure 18:
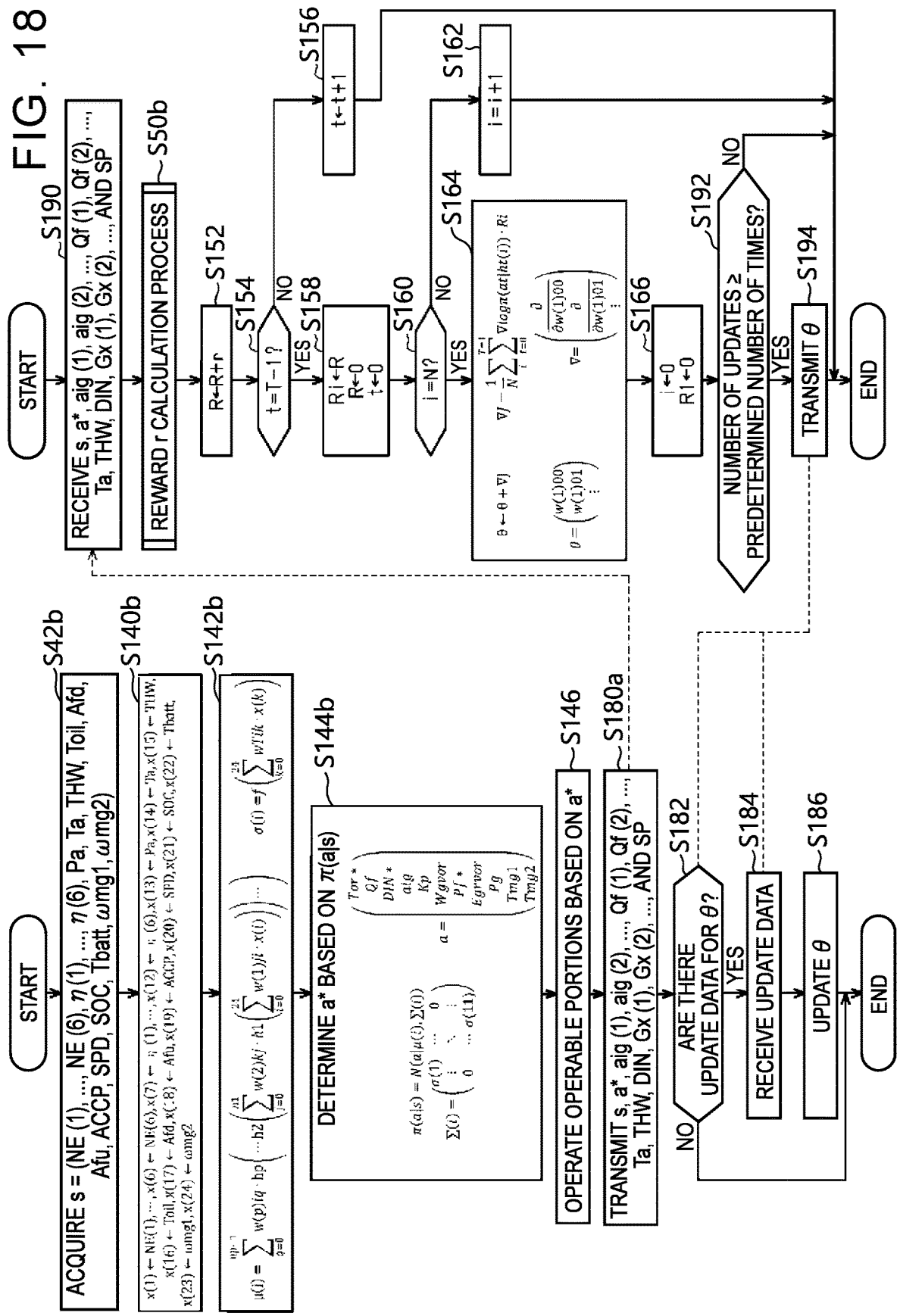
FIG. 18 is a flowchart illustrating the procedures of processes executed by the system according to the embodiment.

FIG. 18 illustrate the procedures of processes for reinforcement learning according to the present embodiment. The processes indicated in a flowchart on the left side of FIG. 18 are implemented by the CPU 92 executing the control program 94b which is stored in the ROM 94 illustrated in FIG. 17. Meanwhile, the processes indicated in a flowchart on the right side of FIG. 18 are implemented by the CPU 202 executing the learning program 94a which is stored in the ROM 204. In FIG. 18, processes corresponding to the processes indicated in FIGS. 13 and 15 are given the same step numbers for convenience. The processes indicated in FIG. 18 will be described below along the chronological order of reinforcement learning.

In the sequence of processes indicated in the flowchart on the left side of FIG. 18, the CPU 92 first acquires a state (S42b). In the present embodiment, the values of variables that are the same as the variables, the values of which are acquired in the process in S42a, are acquired, but chronological data are acquired for the rotational speed NE and the charging efficiency η. That is, chronological data composed of six sampled values "NE (1), NE (2), . . . , NE (6)" are acquired as chronological data on the rotational speed NE, and chronological data composed of six sampled values "η (1), η (2), . . . , η (6)" are acquired as chronological data on the charging efficiency η.

Next, the CPU 92 substitutes the values of the variables acquired in the process in S42b into input variables x of a function approximator (S140b). That is, the CPU 92 substitutes the rotational speed NE (m) into the input variable x (m), and the charging efficiency η (m) into the input variable x (6+m), with "m=1 to 6". The CPU 92 also substitutes the boost pressure Pa into the input variable x (13), the intake air temperature Ta into the input variable x (14), and the water temperature THW into the input variable x (15). The CPU 92 also substitutes the oil temperature Toil into the input variable x (16), the downstream-side detection value Afd into the input variable x (17), the upstream-side detection value Afu into the input variable x (18), the accelerator operation amount ACCP into the input variable x (19), and the vehicle speed SPD into the input variable x (20). The CPU 92 substitutes the charging rate SOC into the input variable x (21), the battery temperature Tbatt into the input variable x (22), the first MG speed ωmg1 into the input variable x (23), and the second MG speed ωmg2 into the input variable x (24).

The CPU 92 calculates the average values μ (1) to μ (11) and the variances σ (1) to σ (11) (S142b) by substituting the input variables x (1) to x (24), which are acquired in the process in S140b, into a function approximator that expresses the average values μ (1) to μ (11) and the variances σ (1) to σ (11). The function approximator according to the present embodiment is the same as that used in the process in S142a except for the number of dimensions of the input variables x.

Next, the CPU 92 determines an action a* based on the policy π (S144b), executes the process in S146, and operates the communication device 97 to transmit the state s, the action a*, and data required to calculate the reward r to the data analysis center 200 (S180a). The data required to calculate the reward r include chronological data on the ignition timing aig as the values of a variable for calculating the PM amount Qpm, chronological data on the required injection amount Qf, and the intake phase difference DIN as the value of a variable for calculating the engine torque Trqeg. The data required to calculate the reward r also include chronological data on the front-rear acceleration Gx and the sound pressure SP. For the others of the input variables in the processes indicated in FIG. 9, the values for the state s are used.

Meanwhile, as illustrated in the flowchart on the right side of FIG. 18, the CPU 202 receives the transmitted data (S190). The CPU 202 calculates a reward based on the received data through the processes in FIG. 16 (S50b), and executes the processes in S152 to S166. Next, the CPU 202 determines whether the number of updates performed in the process in S164 after the process in S194 to be discussed later is executed, or the number of updates performed in the process in S164 after the processes in the flowchart on the right side of FIG. 18 are first performed, is equal to or more than a predetermined number of times (S192). In the case where it is determined that the number of updates is equal to or more than the predetermined number of times (S192: YES), the CPU 202 operates the communication device 207 to transmit the updated parameter θ (S194). The CPU 202 temporarily ends the processes in the flowchart on the right side of FIG. 18 in the case where the process in S156, S162, or S194 is completed or in the case where a negative determination is made in the process in S192. Incidentally, in shipping the vehicles VC1, VC2, . . . etc., the parameter θ which is stored in the storage device 96 in the vehicles VC1, VC2, . . . is stored in the storage device 206.

Meanwhile, as illustrated in the flowchart on the left side of FIG. 18, the CPU 92 determines whether there are any update data for the parameter θ (S182) and, in the case where it is determined there are any such data (S182: YES), receives the update data related to the parameter θ (S184). The CPU 92 updates the relationship prescription data 96a using the received parameter θ (S186). The CPU 92 temporarily ends the sequence of processes indicated in the flowchart on the left side of FIG. 18 in the case where the process in S186 is completed or in the case where a negative determination is made in the process in S182.

In this manner, with the present embodiment, the computation load on the control device 90 can be reduced by the data analysis center 200 updating the parameter θ. According to the present embodiment described above, the following functions and effects can be further obtained.

(4) The data analysis center 200 updates the parameter θ based on data from the plurality of vehicles VC1, VC2, . . . . . Consequently, the frequency of updates of the parameter θ can be increased.

(5) The input variables x for the policy π include chronological data on the rotational speed NE and the charging efficiency η as operation point variables which are variables that prescribe the operation points of the internal combustion engine 10. In the related art in view of the fact that the number of man-hours spent by an expert in order to adapt the relationship between the state of the internal combustion engine 10 and the operation amounts of the operable portions of the internal combustion engine 10 is increased exponentially as the number of dimensions of the state of the internal combustion engine 10 is larger, a single sampled value has been used for each of the state amounts as the state of the internal combustion engine 10. However, this has been done merely in view of the number of man-hours spent for adaptation, and is not necessarily appropriate in order to maximize the fuel consumption rate, the exhaust characteristics, and the drivability. In the present embodiment, on the contrary, solutions that cannot be obtained through the adaption by the related art can be obtained by using chronological data in setting the operation amounts of the operable portions.

Sixth Embodiment

A sixth embodiment will be described below with reference to the drawings, mainly with regard to differences from the fifth embodiment.

Figure 19:
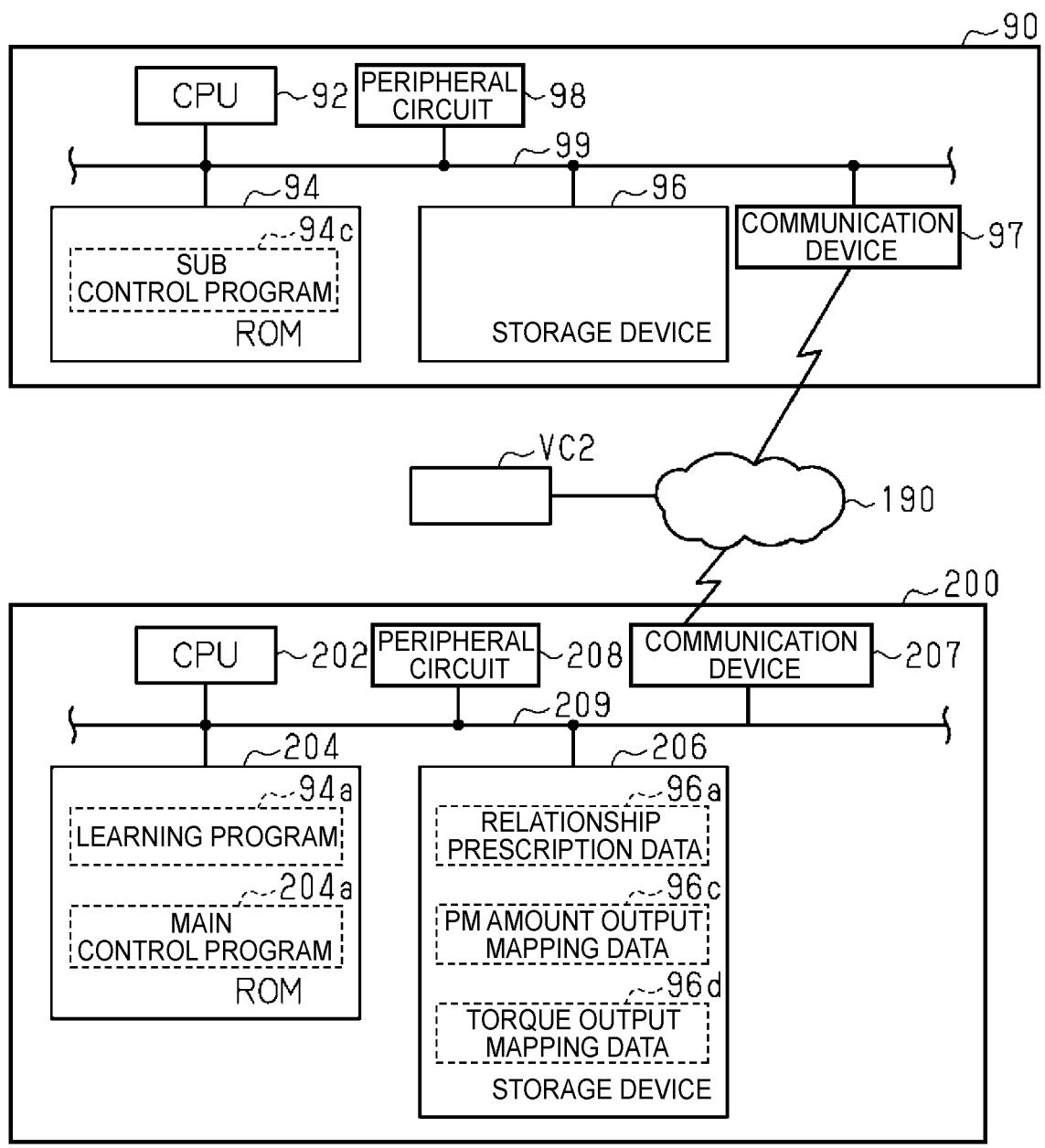
FIG. 19 illustrates the configuration of a system according to a sixth embodiment.

In the present embodiment, an action a* is calculated outside the vehicle VC1, in addition to the parameter θ being updated outside the vehicle VC1. FIG. 19 illustrates the configuration of a control system that executes reinforcement learning according to the present embodiment. In FIG. 19, members corresponding to the members illustrated in FIG. 17 are given the same reference numerals for convenience.

In the vehicle VC1, as illustrated in FIG. 19, the ROM 94 stores a sub control program 94c. Meanwhile, the storage device 96 does not store the relationship prescription data 96a. On the other hand, the ROM 204 of the data analysis center 200 stores a main control program 204a, in addition to the learning program 94a. Meanwhile, the storage device 206 stores the relationship prescription data 96a.

FIG. 20 illustrate the procedures of processes for reinforcement learning according to the present embodiment. The processes indicated in a flowchart on the left side of FIG. 20 are implemented by the CPU 92 executing the sub control program 94c which is stored in the ROM 94 illustrated in FIG. 19. Meanwhile, the processes indicated in a flowchart on the right side of FIG. 20 are implemented by the CPU 202 executing the main control program 204a and the learning program 94a which are stored in the ROM 204. In FIG. 20, processes corresponding to the processes indicated in FIG. 18 are given the same step numbers for convenience. The processes indicated in FIG. 20 will be described below along the chronological order of reinforcement learning.

In the sequence of processes indicated in the flowchart on the left side of FIG. 20, the CPU 92 operates the communication device 97 to transmit the state s acquired in the process in S42b (S200) when the process in S42b is completed.

Meanwhile, as illustrated in the flowchart on the right side of FIG. 20, the CPU 202 receives the state s (S210). The CPU 202 executes the processes in S140b, S142b, and S144b, and operates the communication device 207 to transmit the action a* determined in the process in S144b to the sender of the data received in the process in S210 (S212).

Meanwhile, as illustrated in the flowchart on the left side of FIG. 20, the CPU 92 receives the action a* (S202). The CPU 92 executes the process in S146 based on the received action a*. The CPU 92 operates the communication device 97 to transmit data required to calculate the reward r (S180b). The CPU 92 temporarily ends the sequence of processes indicated in the flowchart on the left side of FIG. 20 in the case where the process in S180b is completed.

On the contrary, as illustrated in the flowchart on the right side of FIG. 20, the CPU 202 receives the transmitted data (S214), executes the processes in S50b and S152 to S166, and temporarily ends the sequence of processes indicated in the flowchart on the right side of FIG. 20.

In this manner, with the present embodiment, the computation load on the vehicle VC1 side can be reduced by the data analysis center 200 executing the process of determining the action a*.

A first mode of the disclosure relates to a method of generating vehicle control data. The method of generating vehicle control data includes: storing, with a storage device, relationship prescription data which are data that prescribe a relationship between a state of a vehicle that includes an internal combustion engine and an operation amount of an operable portion of the internal combustion engine, the state of the vehicle including a state of the internal combustion engine; operating, with an execution device, the operable portion; acquiring, with the execution device, a detection value from a sensor that detects the state of the vehicle; calculating, with the execution device, a reward from a viewpoint of at least one of a fuel consumption rate, an exhaust characteristic, and a drivability based on the detection value; and updating, with the execution device, the relationship prescription data using update mapping determined in advance, the update mapping using the state of the vehicle based on the detection value, an operation amount which is used to operate the operable portion, and the reward corresponding to the operation as arguments, and returning the relationship prescription data which have been updated such that an expected profit for the reward calculated when the operable portion is operated in accordance with the relationship prescription data increases. The execution device and the storage device are exemplified by the CPU 92 and the ROM 94 and the storage device 96 in the case of FIGS. 1, 8, and 14. The execution device and the storage device are also exemplified by the CPU 152 and the ROM 154 and the storage device 156 in the case of FIG. 3. The execution device and the storage device are also exemplified by the CPU 92, 202 and the ROM 94, 204 and the storage device 96, 206 in the case of FIGS. 17 and 19. The update mapping is exemplified by the mapping which is used in the processes in S52 and S54 and the mapping which is used in the processes in S132 to S136, prescribed by the learning program 94a in FIG. 1 and the learning program 154a in FIG. 3. The update mapping is also exemplified by the mapping which is used in the processes in S52 and S54, the mapping which is used in the processes in S132 to S136, and the mapping which is used in the process in S164, prescribed by the learning program 94a in FIGS. 8 and 14. The update mapping is also exemplified by the mapping which is used in the process in S164, prescribed by the learning program 94a in FIGS. 17 and 19. The operation is exemplified by the process in S46, the process in S116, and the process in S146. The acquisition is exemplified by the processes in S42 and S60, the process in S112, the processes in S42 and S60a, the processes in S42a and S60b, and the processes in S42b and S60b. The reward calculation is exemplified by the process in S50, the processes in S120 to S126, the process in S50a, and the processes in FIG. 16. The update is exemplified by the processes in S52 and S54, the processes in S128 to S136, and the process in S164.

With the method described above, it is possible to grasp what reward can be obtained through an operation of the operable portion by calculating a reward that accompanies such an operation. The relationship between the state of the vehicle and the operation amount of the operable portion of the internal combustion engine can be set by updating the relationship prescription data using update mapping which has been subjected to reinforcement learning based on the reward. Thus, the number of man-hours required for an expert in setting the relationship between the state of the vehicle and the operation amount of the operable portion of the internal combustion engine can be reduced.

In the first mode described above, the reward may be larger when the exhaust characteristic corresponds to a predetermined characteristic than when the exhaust characteristic do not correspond to the predetermined characteristic. The predetermined characteristic may include at least one of an amount of emission of nitrogen oxides falling within a predetermined range, an amount of emission of unburned fuel falling within a predetermined range, an amount of emission of particulate matter falling within a predetermined range, and a temperature of a catalyst provided in an exhaust passage of the internal combustion engine falling within a predetermined range. The configuration described above is exemplified by the processes in S62 to S66 and the processes in S62a, S64, and S66.

With the method described above, the relationship prescription data which are appropriate to cause the exhaust characteristics to correspond to the predetermined characteristics can be learned through reinforcement learning.

In the first mode described above, the execution device may calculate the reward such that at least one of following conditions is met: the reward which has been quantified from the viewpoint of the drivability is larger when an acceleration of the vehicle falls within a first predetermined range than when the acceleration of the vehicle is outside the first predetermined range; the reward which has been quantified from the viewpoint of the drivability is larger when a jerk of the vehicle falls within a second predetermined range than when the jerk is outside the second predetermined range; and the reward which has been quantified from the viewpoint of the drivability is larger when a level of sound generated by the internal combustion engine falls within a third predetermined range than when the level of the sound is outside the third predetermined range. The configuration described above is exemplified by the processes in S72 to S76.

With the method described above, the relationship prescription data which are appropriate to meet a requirement for the drivability can be learned through reinforcement learning.

The method of generating vehicle control data according to the first mode described above may further include generating, with the execution device, control mapping data using the state of the vehicle as an argument and returning the operation amount which maximizes the expected profit by making one-to-one correspondence between the state of the vehicle and the operation amount which maximizes the expected profit based on the relationship prescription data which is updated. The configuration described above is exemplified by the processes in FIG. 6. In particular, the execution device and the storage device are exemplified by the CPU 152 and the ROM 154 and the storage device 156, respectively. The control mapping data are exemplified by the map data 96b.

With the method described above, the control mapping data are generated based on the relationship prescription data which have been learned through reinforcement learning. Therefore, it is possible to conveniently set an operation amount that maximizes the expected profit based on the state of the vehicle by installing the control mapping data in the control device.

A second mode of the disclosure relates to a vehicle control device. The vehicle control device includes the storage device and the execution device according to the first mode described above. In the vehicle control device, the execution device is configured to operate the operable portion based on the operation amount which is determined in accordance with the relationship prescription data and the state of the vehicle. The execution device and the storage device are exemplified by the CPU 92 and the ROM 94 and the storage device 96, respectively.

With the configuration described above, the vehicle control device can learn the relationship prescription data along with an operation of the operable portion of the internal combustion engine which is mounted on the vehicle.

In the second mode described above, the execution device may be configured to acquire, as the detection value, a required value and a calculated value of at least one of an output and torque of the internal combustion engine, and calculate the reward such that the reward is larger when an absolute value of a difference between the required value and the calculated value is equal to or less than a predetermined value than when the absolute value is more than the predetermined value. The acquisition is exemplified by the process in S60a. The reward calculation is exemplified by the processes in S78 to S82.

With the configuration described above, it is possible to learn the relationship prescription data which are appropriate to control at least one of the fuel consumption rate, the exhaust characteristics, and the drivability to a target on condition that the torque or the output of the internal combustion engine is brought closer to the required value.

In the second mode described above, the vehicle may include a transmission configured to change a speed of rotation output from a crankshaft of the internal combustion engine and output rotation having a changed speed, and configured to change a speed ratio. The relationship which is prescribed by the relationship prescription data may include a relationship between a state of the transmission and an operation amount of the transmission. The execution device may be configured to acquire, as the detection value, a value detected by a sensor configured to detect the state of the transmission, calculate the reward such that at least one of following conditions is met: the reward is larger when a time required for the transmission to switch the speed ratio falls within a predetermined time than when the time exceeds the predetermined time; the reward is larger when an absolute value of a speed of change in a rotational speed of an input shaft of the transmission is equal to or less than a predetermined input-side value than when the absolute value of the speed of change in the rotational speed of the input shaft is more than the predetermined input-side value; the reward is larger when an absolute value of a speed of change in a rotational speed of an output shaft of the transmission is equal to or less than a predetermined output-side value than when the absolute value of the speed of change in the rotational speed of the output shaft is more than the predetermined output-side value; and the reward is larger when a hydraulic pressure regulated by a solenoid valve (80a) of the transmission meets a predetermined condition than when the hydraulic pressure does not meet the predetermined condition, and update the relationship between the state of the transmission and the operation amount of the transmission prescribed by the relationship prescription data, by using the detection value and related to the state of the transmission as the argument of the update mapping. The relationship prescription data are exemplified by the relationship prescription data 96a in FIGS. 1 and 8. The state of the transmission is exemplified by the input rotational speed ωin, the output rotational speed ωout, the hydraulic pressure Poila, and the hydraulic pressure Poilb. The operation amount is exemplified by the solenoid current command values ia* and ib*.

With the configuration described above, the relationship prescription data which are appropriate to determine the operation amount of the transmission based on the state of the transmission can be learned.

In the second mode described above, the vehicle may include the vehicle may include a rotary electric machine configured to provide power to drive wheels. The relationship which is prescribed by the relationship prescription data may include a relationship between a state of a power accumulation device that supplies electric power to the rotary electric machine and a control amount of the rotary electric machine. The execution device is configured to operate a drive circuit of the rotary electric machine, acquire the state of the power accumulation device as the detection value, calculate the reward such that the reward is larger when the state of the power accumulation device falls within a predetermined range than when the state of the power accumulation device is outside the predetermined range, and update the relationship between the state of the power accumulation device and the control amount of the rotary electric machine prescribed by the relationship prescription data, by using the state of the power accumulation device and the control amount of the rotary electric machine as arguments of the update mapping. The power accumulation device is exemplified by the battery 170. The state of the power accumulation device is exemplified by the battery temperature Tbatt and the charging rate SOC.

With the configuration described above, the relationship prescription data which are appropriate to determine the control amount of the rotary electric machine based on the state of the power accumulation device can be learned.

In the second mode described above, the execution device may be configured to acquire, as the detection value, a required value and a calculated value of at least one of an output and drive torque of the vehicle, and calculate the reward such that the reward is larger when an absolute value of a difference between the required value and the calculated value for the at least one of the output and the drive torque of the vehicle is equal to or less than a predetermined value than when the absolute value is more than the predetermined value. The acquisition is exemplified by the process in S60b. The reward calculation is exemplified by the processes in S78a, S80, and S82.

With the configuration described above, it is possible to learn the relationship prescription data which are appropriate to control at least one of the fuel consumption rate, the exhaust characteristics, and the drivability to a target on condition that the output or the drive torque of the vehicle is brought closer to the required value.

In the second mode described above, the relationship prescription data may include data that prescribe a relationship among the state of the vehicle, the expected profit, and the operation amount. The execution device is further configured to select an operation amount that increases the expected profit in priority to an operation amount that reduces the expected profit based on the detection value and the relationship prescription data. The execution device is configured to operate the operable portion based on the operation amount which is selected. The selection is exemplified by the process in S44.

With the configuration described above, the operation amount which increases the expected profit is selected in priority in the select process, and thus the operation which increases the expected profit can be executed in priority in the operation process.

In the second mode described above, the relationship prescription data may be data that prescribe a function approximator that uses the state of the vehicle as an argument and that returns a probability of selecting the operation amount. The update mapping may include mapping that returns an update amount of a parameter that prescribes the function approximator. The function approximator is exemplified by the function approximator which outputs the average value $\mu$ (i) and the variance $\sigma$ (i).

With the configuration described above, the relationship between the state of the vehicle and the operation amount can be directly prescribed by using a function approximator for a policy.

A third mode of the disclosure relates to a vehicle control system. The vehicle control system includes the execution device and the storage device according to the second mode described above. The execution device includes a first execution device mounted on the vehicle and a second execution device that is separate from in-vehicle devices; the first execution device executes at least the acquiring and the operating; and the second execution device executes at least the updating. The first execution device is exemplified by the CPU 92 and the ROM 94. The second execution device is exemplified by the CPU 202 and the ROM 204.

With the configuration described above, the update process is executed by the second execution device, and thus the computation load on the first execution device can be reduced compared to the case where the update process is also executed by the first execution device. The second execution device being separate from the in-vehicle devices means that the second execution device is not an in-vehicle device.

In the third mode described above, the first execution device may be further configured to transmit data related to the detection value to the second execution device, receive the operation amount which is transmitted by the second execution device, and operate the operable portion based on the operation amount which is received from the second execution device. The second execution device may be further configured to receive the data which are transmitted by the first execution device, calculate the operation amount based on the data which are received from the first execution device and the relationship prescription data, and transmit the calculated operation amount. The transmitting by the first execution device is exemplified by the process in S200. The reception by the first execution device is exemplified by the process in S202. The reception by the second execution device is exemplified by the process in S210. The operation amount calculation is exemplified by the processes in S140b, S142b, and S144b in the flowchart on the right side of FIG. 20. The transmitting by the second execution device is exemplified by the process in S212.

With the configuration described above, the operation amount calculation process is executed by the second execution device, and thus the computation load on the first execution device can be reduced compared to the case where the operation amount calculation process is also executed by the first execution device.

A fourth mode of the disclosure relates to a vehicle control device. The vehicle control device includes the first execution device according to the third mode described above. The vehicle control device is exemplified by the control device 90 in FIGS. 17 and 19.

A fifth mode of the disclosure relates to a vehicle learning device. The vehicle learning device includes the second execution device according to the third mode described above. The vehicle learning device is exemplified by the data analysis center 200.

Another mode of the disclosure provides a method of generating vehicle control data, the method causing an execution device to execute: an operation process of operating a transmission with a storage device storing relationship prescription data, the transmission being a device that changes a speed of rotation transferred from a crankshaft of the internal combustion engine and outputs the rotation and that has a variable speed ratio, and the relationship prescription data prescribing the relationship between the state of the transmission and the operation amount of the transmission; an acquisition process of acquiring a detection value from a sensor that detects the state of the transmission; a reward calculation process of calculating a reward based on the drivability of the vehicle that accompanies an operation of the transmission based on the detection value which is acquired in the acquisition process; and an update process of updating the relationship prescription data using, as inputs to update mapping determined in advance, the state of the transmission which is based on the detection value which is acquired in the acquisition process, the operation amount which is used to operate the transmission, and the reward corresponding to the operation, in which the update mapping outputs the relationship prescription data which have been updated so as to increase an expected profit for the reward for a case where the transmission is operated in accordance with the relationship prescription data. The execution device and the storage device are exemplified by the CPU 92 and the ROM 94 and the storage device 96 in FIGS. 1 and 8. The operation process is exemplified by the process in S116. The acquisition process is exemplified by the process in S112. The reward calculation process is exemplified by the processes in S120 to S126. The update process is exemplified by the processes in S128 to S136.

With the configuration described above, it is possible to grasp what reward can be obtained through an operation of the operable portion by calculating a reward that accompanies such an operation. The relationship between the state of the transmission and the operation amount of the transmission can be set by updating the relationship prescription data using update mapping which has been subjected to reinforcement learning based on the reward. Thus, the number of man-hours required for an expert in setting the relationship between the state of the transmission and the operation amount of the transmission can be reduced.

Still another mode of the disclosure provides a method of generating vehicle control data, the method being applied to a vehicle that includes an internal combustion engine and a rotary electric machine as thrust generation devices and causing an execution device to execute: an operation process of operating an operable portion of the internal combustion engine and a drive circuit of the rotary electric machine with a storage device storing relationship prescription data, the relationship prescription data prescribing the relationship between the state of the vehicle and the operation amount of the internal combustion engine and the control amount of the rotary electric machine; an acquisition process of acquiring a required value and a calculated value of at least one of an output of the vehicle and drive torque of the vehicle; a reward calculation process of giving, based on the required value and the calculated value which are acquired in the acquisition process, a large reward in the case where the absolute value of the difference between the calculated value and the required value is small compared to the case where such an absolute value is large; and an update process of updating the relationship prescription data using, as inputs to update mapping determined in advance, the state of the vehicle, the operation amount of the operable portion and the control amount of the rotary electric machine corresponding to an operation in the operation process, and the reward corresponding to the operation, in which the update mapping outputs the relationship prescription data which have been updated so as to increase an expected profit for the reward for a case where the operable portion and the drive circuit are operated in accordance with the relationship prescription data. The execution device and the storage device are exemplified by the CPU 92 and the ROM 94 and the storage device 96 in the case of FIG. 14. The execution device and the storage device are also exemplified by the CPU 92, 202 and the ROM 94, 204 and the storage device 96, 206 in the case of FIGS. 17 and 19. The operation process is exemplified by the process in S146. The acquisition process is exemplified by the process in S42*a* and the process in S42*b*. The reward calculation process is exemplified by the processes in FIG. 16.

With the configuration described above, it is possible to grasp what reward can be obtained through an operation of the operable portion by calculating a reward that accompanies such an operation. The relationship between the state of the vehicle and the operation amount of the operable portion of the internal combustion engine and the control amount of the rotary electric machine can be set by updating the relationship prescription data using update mapping which has been subjected to reinforcement learning based on the reward. Thus, the number of man-hours required for an expert in setting the relationship between the state of the vehicle and the operation amount of the operable portion of the internal combustion engine and the control amount of the rotary electric machine can be reduced.

Still another mode of the disclosure provides the method of generating vehicle control data described above, in which the reward calculation process includes a process of giving a large reward in the case where the energy consumption rate of the vehicle is low compared to the case where the energy consumption rate of the vehicle is high. The configuration described above is exemplified by the processes in S68 and S70.

With the configuration described above, the relationship prescription data can be learned so as to reduce the energy consumption rate of the vehicle while bringing the output or the drive torque of the vehicle to the required value.

Still another mode of the disclosure provides the method of generating vehicle control data described above, in which the reward calculation process includes a process of giving a large reward in the case where the charging rate of a power accumulation device that supplies electric power to the rotary electric machine is within a predetermined rate range compared to the case where the charging rate of the power accumulation device is outside the predetermined rate range. The configuration described above is exemplified by the processes in S170 and S172. The power accumulation device is exemplified by the battery 170.

It is desirable that the charging rate of the power accumulation device should be in the predetermined rate range. Thus, with the configuration described above, the relationship prescription data which are appropriate to bring the charging rate of the power accumulation device to the predetermined rate range can be learned by giving a large reward in the case where the charging rate of the power accumulation device is within the predetermined rate range compared to the case where the charging rate of the power accumulation device is outside the predetermined rate range through the reward calculation process.

Another mode of the disclosure provides the method of generating vehicle control data described above, in which the reward calculation process includes a process of giving a large reward in the case where the temperature of a power accumulation device that supplies electric power to the rotary electric machine is within a predetermined temperature range compared to the case where the temperature of the power accumulation device is outside the predetermined temperature range. The configuration described above is exemplified by the processes in S174 and S176. The power accumulation device is exemplified by the battery 170.

It is desirable that the temperature of the power accumulation device should be in the predetermined temperature range. Thus, with the configuration described above, the relationship prescription data which are appropriate to bring the temperature of the power accumulation device to the predetermined temperature range can be learned by giving a large reward in the case where the temperature of the power accumulation device is within the predetermined temperature range compared to the case where the temperature of the power accumulation device is outside the predetermined temperature range through the reward calculation process.

Another mode of the disclosure provides a vehicle control device including an execution device and a storage device, in which: the storage device stores relationship prescription data that prescribe the relationship among the state of a vehicle on which an internal combustion engine is mounted, the operation amount of an operable portion of the internal combustion engine, and an expected profit for a reward from the viewpoint of at least one of the fuel consumption rate of the internal combustion engine, the exhaust characteristics of the internal combustion engine, and the drivability of the vehicle on which the internal combustion engine is mounted; and the execution device executes an acquisition process of acquiring a detection value from a sensor that detects the state of the vehicle, a select process of selecting the operation amount which maximizes the expected profit based on the state of the vehicle which is based on the detection value which is acquired in the acquisition process and the relationship prescription data, and an operation process of operating the operable portion based on the operation amount which is selected in the select process. The execution device and the storage device are exemplified by the CPU 92 and the ROM 94 and the storage device 96 in FIG. 8. The acquisition process is exemplified by the process in S42 in FIG. 10. The select process is exemplified by the process in S44 in FIG. 10. That is, while a greedy action is not always selected in the process in S44, a greedy action is selected in the case where exploration is not performed. The operation process is exemplified by the process in S46 in FIG. 10.

The relationship prescription data are data that prescribe the relationship among the state of the vehicle, the operation amount of the operable portion, and the expected profit, and thus can be learned through reinforcement learning. Thus, with the vehicle control device described above, the number of man-hours required for an expert in adapting the operation amount of the operable portion can be reduced.

Another mode of the disclosure provides a vehicle control device including an execution device and a storage device, in which: the storage device stores relationship prescription data that prescribe the relationship among the state of a transmission, the operation amount of the transmission, and an expected profit for a reward based on the drivability of a vehicle, the transmission being a device that changes a speed of rotation transferred from a crankshaft of the internal combustion engine and outputs the rotation and that has a variable speed ratio; and the execution device executes an acquisition process of acquiring a detection value from a sensor that detects the state of the transmission, a select process of selecting the operation amount which maximizes the expected profit based on the detection value which is acquired in the acquisition process and the relationship prescription data, and an operation process of operating the transmission based on the operation amount which is selected in the select process. The execution device and the storage device are exemplified by the CPU 92 and the ROM 94 and the storage device 96 in FIGS. 1 and 8. The acquisition process is exemplified by the process in S112. The select process is exemplified by the process in S114. That is, while a greedy action is not always selected in the process in S114, a greedy action is selected in the case where exploration is not performed. The operation process is exemplified by the process in S116.

The relationship prescription data are data that prescribe the relationship among the state of the transmission, the operation amount of the transmission, and the expected profit, and thus can be learned through reinforcement learning. Thus, with the vehicle control device described above, the number of man-hours required for an expert in adapting the operation amount of the transmission can be reduced.

Still another mode of the disclosure provides a vehicle control device including an execution device and a storage device, in which: the storage device stores relationship prescription data that prescribe the relationship between the state of a vehicle on which an internal combustion engine is mounted and the operation amount of an operable portion of the internal combustion engine, the state of the vehicle including the state of the internal combustion engine; and the execution device executes an acquisition process of acquiring a detection value from a sensor that detects the state of the vehicle, and an operation process of operating the operable portion in accordance with the operation amount of the operable portion which is based on the detection value which is acquired in the acquisition process and the relationship prescription data, in which the relationship prescription data prescribe the relationship between chronological data related to a predetermined state of the vehicle and the operation amount. The execution device and the storage device are exemplified by the CPU 92 and the ROM 94 and the storage device 96 in FIG. 17. The acquisition process is exemplified by the process in S42$b$. The operation process is exemplified by the process in S146. The predetermined state is exemplified by the rotational speed NE and the charging efficiency $\eta$.

As discussed above, an expert has spent a lot of man-hours to adapt the operation amount of the drive system of the internal combustion engine etc., and thus there has been an incentive to avoid an increase in the number of dimensions of the state to be input in order to set the operation amount. However, there is a higher possibility that the operation amount can be set more appropriately when the operation amount is set based on chronological data including sampled values that are chronologically adjacent to each other for a predetermined state than when the operation amount is set based on only a single sampled value for the state. Thus, with the configuration described above, target control can be executed more appropriately by operating the operable portion using the operation amount which is based on the chronological data related to the predetermined state.

Still another mode of the disclosure provides the vehicle control device described above, in which the chronological data include chronological data on an operation point variable which is a variable that prescribes an operation point of the internal combustion engine. The execution device and the storage device are exemplified by the CPU 92 and the ROM 94 and the storage device 96 in FIG. 17. The acquisition process is exemplified by the process in S42$b$. The operation process is exemplified by the process in S146. The predetermined state is exemplified by the rotational speed NE and the charging efficiency 11.

OTHER EMBODIMENTS

The embodiments may be modified as follows. The embodiments and the following modifications can be combined with each other unless such embodiments and modifications technically contradict with each other.

Relationship Prescription Data

1. Action Value Function Q

While the action value function Q is a table-type function in the embodiments described above, the disclosure is not limited thereto. For example, a function approximator may also be used.

2. Policy for Indicating Operation Amount

While multivariate Gaussian distribution is used as the policy to be updated through a policy gradient method etc. and the covariance matrix of the multivariate Gaussian distribution is a diagonal matrix which enables the variance to be set independently for each dimension of an action, the disclosure is not limited thereto. For example, the variance may be set to a common value for each dimension of an action. In addition, it is not essential that the covariance matrix should be a diagonal matrix, for example. In addition, it is also not essential to constitute a function approximator that determines components of the covariance matrix from linear mapping and a function f to which an output from the linear mapping is input. For example, the function approximator may be constituted from a neural network. Further, it is also not essential that the function approximator which determines the average of the multivariate Gaussian distribution should be a neural network. For example, the function approximator may be linear coupling of a plurality of basis functions to which input variables are input. The method of setting the initial values of the function approximator such as the average value $\mu$ (i) and the variance $\sigma$ (i) is not limited to a method that utilizes control on an internal combustion engine that has been adapted and that has the same displacement and the same operable portions as those of the internal combustion engine 10.

3. State

The catalyst 38 may include a filter that traps PM, and the amount (PM deposition amount) of PM deposited on the filter may be included in the state, for example. Consequently, control that does not make the PM deposition amount excessively large can be learned easily through reinforcement learning by providing a high reward to an action to execute a process of regenerating the filter in the case where the PM deposition amount is large. The PM deposition amount may be estimated based on the operation state etc. of the internal combustion engine 10, for example.

In addition, the sulfur poisoning amount of the catalyst 38 may be included in the state, for example. Consequently, control that does not make the sulfur poisoning amount excessively large can be learned easily through reinforcement learning by providing a high reward to an action to execute a process of regenerating the catalyst 38 in the case where the sulfur poisoning amount is large. The sulfur poisoning amount may be estimated based on the required injection amount Qf etc., for example.

In the case where the operation amounts of the operable portions are subjected to feedback control, the control amounts in the feedback control may be added to the state. That is, while the throttle opening degree command value Tor* is included in the action in the embodiments described above, for example, the opening degree (throttle Tor) of the throttle valve 16 may be included in the state, since the throttle opening degree Tor is controlled to the throttle opening degree command value Tor* through feedback control. Consequently, the manner of controlling the control amounts to the command values can be learned through reinforcement learning.

In the case where the vehicle VC1 is automatically steered, for example, it is desirable that the state should include the required engine torque value Trqeg*, the required engine output value Peg*, the required output value Ptot*, and the required drive torque value Trq* as output variables which are variables that indicate an output for a thrust generation device of the vehicle. In the embodiments described above, the required engine torque value Trqeg*, the required engine output value Peg*, the required output value Ptot*, and the required drive torque value Trq* may be included in the state as output variables, in place of the accelerator operation amount ACCP.

2-1. State Expressed by Chronological Data

While six data that are chronologically adjacent to each other are included in the state for the rotational speed NE and the charging efficiency $\eta$ in the processes in FIGS. 18 and 20, the number of sampled values that constitute chronological data is not limited to six. It is only necessary that the number of such values should be two or more, and the number of such values may be three or more. In this event, it is not essential that the number of sampled values of the rotational speed NE that constitute chronological data and the number of sampled values of the charging efficiency that constitute chronological data should be equal to each other.

While chronological data on the rotational speed NE and chronological data on the charging efficiency $\eta$ are used in the processes in FIGS. 18 and 20, chronological data on only one of the rotational speed NE and the charging efficiency $\eta$ may be used, rather than chronological data on the two.

The chronological data to be used as the state in reinforcement learning are not limited to operation point variables which are variables that indicate operation points of the internal combustion engine 10. For example, such chronological data may be on the accelerator operation amount ACCP etc., or may be on the intake phase difference DIN etc., for example, or may be on the first MG speed $\omega$mg1, the second MG speed $\omega$mg2, etc., for example. The chronological data are not limited to being input to the policy $\pi$ which is expressed by a function approximator, and may be input to the action value function Q which is expressed by a function approximator, for example.

4. Action

The action is not limited to those described in relation to the embodiments described above. For example, the action may include operation amounts such as the injection timing, the number of injections in one combustion cycle, and the number of ignitions in one combustion cycle. The action may also include the timing when fuel vapor trapped by the canister 66 is caused to flow out to the intake passage 12, for example. In the case where the internal combustion engine 10 includes tumble control valves, for example, the operation amount of such valves may be used as an action. Meanwhile, in the case where the internal combustion engine 10 includes swirl control valves, for example, the operation amount of such valves may be used as an action. In the case where the control device 90 executes start-stop control for the internal combustion engine 10, for example, the timing to stop idling may be used as an action. In the case where the intake passage 12 of the internal combustion engine 10 includes a passage that detours around the supercharger 14 and an air bypass valve that regulates the cross-sectional area of a flow path in the passage, the opening degree of the air bypass valve may be used as an operation amount. In the case where the internal combustion engine 10 has a structure with a changeable intake passage, the operation amount of such a structure may be used as an action. In the case where the internal combustion engine 10 includes a pair of intake valves 20 for each cylinder and one of such valves can be selectively kept closed, it may be used as an action whether any such valve is selectively closed. In that case, the operable portions include the intake valves 20. In the case where the control device 90 executes control so as to stop combustion control for an air-fuel mixture in a particular cylinder, for example, it may be used as an action whether such control is being executed. In that case, the corresponding operable portions include the port injection valve 18, the in-cylinder injection valve 28, and the ignition device 30. In the case where the internal combustion engine 10 has a variable compression ratio, an operation to vary the compression ratio may be used as an action. The opening degree of a flow rate control valve that regulates the cross-sectional area of a flow path in a circulation path for cooling water in the internal combustion engine may be used as an action.

It is not essential that the action should be multidimensional. For example, in the case where a predetermined operable portion is newly added to the existing internal combustion engine, only the relationship between the operation amount of the operable portion and the state may be learned through reinforcement learning. In this case, the state may include operation amounts of other operable portions.

The action may include an operation amount such as the hydraulic pressure of the transmission 80. The action may include the control amount (speed ratio) of the transmission 80. The action is not limited to the operation amounts of the operable portions of the internal combustion engine 10, the operation amount or the control amount of the transmission 80, and the control amounts of the first motor/generator 162 and the second motor/generator 166. For example, it may be used as an action whether the lock-up clutch 72 of the torque converter 70 is engaged. A gain for controlling the throttle opening degree Tor to the throttle opening degree command value Tor* through feedback control may be added, for example.

Update Mapping

1. Update of Action Value Function Q 1-1. Update of Action Value Function Q which Uses Operation Amount of Internal Combustion Engine 10 as Action While an off-policy TD method is used in the processes in S52 and S54, the disclosure is not limited thereto. For example, an on-policy TD method such as SARSA may also be used. An eligibility trace method may also be used for on-policy learning.

However, the disclosure is not limited thereto, and a Monte Carlo method may also be used, for example.

1-2. Update of Action Value Function Q which Uses Operation Amount of Speed Change Device 80 as Action While an ε-soft on-policy Monte Carlo method is used for update mapping for the action value function Q related to the transmission 80 in FIG. 7, the disclosure is not limited thereto. For example, an off-policy Monte Carlo method may also be used. The disclosure is not limited to the use of a Monte Carlo method. For example, an off-policy TD method may also be used as in the processes in S52 and S54, an on-policy TD method such as SARSA may also be used, for example, or an eligibility trace method may also be used for on-policy learning, for example.

1-3. Others

It is not essential that the action value function Q which uses the operation amounts of the internal combustion engine 10 as actions and the action value function Q which uses the operation amount of the transmission 80 as an action should be separate value functions. The action value function Q is not limited to one that uses the operation amounts of the internal combustion engine 10 as actions or one that uses the operation amount of the transmission 80 as an action, and may be one that uses the control amounts of the first motor/generator 162 and the second motor/generator 166 as actions. For example, a common action value function Q that uses the operation amounts of the internal combustion engine 10 and the control amounts of the first motor/generator 162 and the second motor/generator 166 may also be used. A common action value function Q that uses the operation amounts of the internal combustion engine 10 and the control amount of the transmission 80 may also be used, for example. A common action value function Q that uses the operation amounts of the internal combustion engine 10 and the operation amount and the control amount of the transmission 80 may also be used, for example.

In the case where a function approximator for the action value function Q is used as described in "1. Action Value Function Q" under "Relationship Prescription Data", the update mapping may be configured to include mapping that outputs an update amount of a parameter that prescribes the action value function Q based on the partial differential of the action value function Q with respect to the parameter, for example.

2. Update of Parameter of Function Approximator that Prescribes Policy

While the profit Ri is a simple average for a time T in the process in S164, the disclosure is not limited thereto. For example, the profit Ri may be a sum obtained using values of the reward r that have been reduced by a predetermined reduction rate γ more significantly as the reward r is older. This corresponds to an exponential moving average process.

In the process in S164, the profit Ri may be replaced with a value obtained by subtracting an appropriate baseline function that does not depend on the parameter θ from the profit Ri. Specifically, it is desirable that the baseline function should be a function that minimizes the variance of the partial differential of the expected profit J with respect to the parameter, for example.

The actions designated by a policy approximated by a function approximator are not limited to the operation amounts of the internal combustion engine 10 or the control amounts of the first motor/generator 162 and the second motor/generator 166. For example, such actions may be the operation amount and the control amount of the transmission 80. Specifically, the policy may designate only the operation amount of the transmission 80, or may designate the operation amounts of the internal combustion engine 10 and the operation amount of the transmission 80, for example, or may designate the operation amounts of the internal combustion engine 10 and the operation amount and the control amount of the transmission 80, for example. In the case where a parallel hybrid vehicle to be described below in "Vehicle" includes a transmission, for example, the policy may designate the control amount of the motor/generator and the operation amount of the transmission, or may designate the control amount of the motor/generator and the control amount of the transmission, or may designate the control amount of the motor/generator and the operation amount and the control amount of the transmission. Alternatively, the policy may designate the operation amounts of the operable portions of the internal combustion engine, the control amount of the motor/generator, and the operation amount of the transmission, or may designate the operation amounts of the operable portions of the internal combustion engine, the control amount of the motor/generator, and the control amount of the transmission, or may designate the operation amounts of the operable portions of the internal combustion engine, the control amount of the motor/generator, and the operation amount and the control amount of the transmission, for example.

3. Others

While the policy π is updated as a result of an update of the action value function Q in the case where the action value function Q is used in the examples illustrated in FIGS. 4, 7, and 10, the disclosure is not limited thereto. For example, both the action value function Q and the policy π may be updated as in an actor critic method. The actor critic method is not limited thereto, and a value function V may be updated in place of the action value function Q, for example.

The learning rate α is not limited to a fixed value, and may be changed in accordance with a rule determined in advance in accordance with the degree of progress of learning. "ε" for determining the policy π is also not limited to a fixed value, and may be changed in accordance with a rule determined in advance in accordance with the degree of progress of learning.

Reward Calculation Process

1. Reward Related to Fuel Consumption Rate

While the integrated value InQf is used as an input and a reward is calculated in accordance with the magnitude thereof in the embodiments described above, the disclosure is not limited thereto. For example, a large reward may be given in the case where the amount of emission of carbon dioxide to the exhaust passage 36 is small compared to the case where the amount of such emission is large. Meanwhile, a large reward may be given in the case where the intake air amount Ga is large compared to the case where the intake air amount Ga is small, even when the integrated value InQf and the amount of emission of carbon dioxide are the same.

2. Reward Related to Exhaust Characteristics 2-1. Learning Before Shipment

While a reward is determined in accordance with whether the logical product of the conditions (1) to (6) is true in the processes in S62 to S66, the disclosure is not limited thereto. For example, a large reward may be given in the case where each of the conditions (1) to (6) is met compared to the case where such a condition is not met.

It is not essential to use all the conditions (1) to (6) in the processes in S62 to S66. For example, a reward may be given based on only one to five of the six conditions (1) to (6).

2-2. Learning after Shipment

While a reward is determined in accordance with whether the logical product of the conditions (2) and (5) is true in the processes in S62a, S64, and S66, the disclosure is not limited thereto. For example, a large reward may be given in the case where each of the conditions (2) and (5) is met compared to the case where such a condition is not met.

It is not essential to use both the conditions (2) and (5) in the processes in S62a, S64, and S66. It is also not essential to use at least only one of the two conditions (2) and (5). For example, a reward may be calculated based on only some of the four conditions (1), (3), (4), and (6). In the case where a reward is calculated based on the condition (3) or (4), the vehicle VC1 may be provided with a dedicated sensor or mapping that outputs the NOx amount Qnox or the unburned fuel amount Qch. The mapping may be learned and generated during learning before shipment in the same manner as the PM amount output mapping data 96c, for example.

2-3. Others

The reward related to the exhaust characteristics is not limited to that described above. For example, the reward may include an exhaust temperature Tex. In this case, in the case where the state includes the PM deposition amount or the sulfur poisoning amount as described in "3. State" under "Relationship Prescription Data", for example, a large reward may be given when the amount of PM or sulfur poisoning is large in the case where the exhaust temperature is such a temperature that enables regeneration of the catalyst 38.

A large reward may be given in the case where the temperature of the catalyst 38 is within a predetermined range compared to the case where such a temperature is outside the predetermined range, for example. The predetermined range may be a temperature range in which the exhaust purification rate is high, for example. In the case where the state includes the PM deposition amount or the sulfur poisoning amount as described in "3. State" under "Relationship Prescription Data", a large reward may be given when the amount of PM or sulfur poisoning is large in the case where the exhaust temperature is such a temperature that enables regeneration of the catalyst 38.

In the case where map data that include the rotational speed NE, the charging efficiency η, etc. as input variables and the EGR opening degree command value Egrvor as an output variable are adapted not through reinforcement learning, for example, a large reward may be given in the case where the absolute value of the difference between a boost pressure assumed in setting the EGR opening degree command value Egrvor and the boost pressure Pa is equal to or less than a predetermined value compared to the case where the absolute value of such a difference is more than the predetermined value. This is in view of the fact that control on the EGR amount deviates from the assumption in the case where the boost pressure Pa deviates from the assumed value. The difference between the actual rotational speed of a turbine of the supercharger 14 and the rotational speed of the turbine assumed in setting the EGR opening degree command value Egrvor may be used in place of the boost pressure.

3. Reward Related to Drivability

While a reward is determined in accordance with whether the logical product of the conditions (11) to (13) is true in the processes in S72 to S76, the disclosure is not limited thereto. For example, a large reward may be given in the case where each of the conditions (11) to (13) is met compared to the case where such a condition is not met.

It is not essential to use all the conditions (11) to (13) in the processes in S72 to S76. For example, a reward may be given based on only one or two of the three conditions (11) to (13).

The reward related to the drivability is not limited to that described above. For example, a large reward may be given in the case where the amount of fluctuation in rotation of various rotary shafts of the drive system, such as the crankshaft 32 and the output shaft 84, is equal to or less than a predetermined value compared to the case where the amount of such fluctuation is more than the predetermined value.

Regarding the amount of fluctuation in rotation, a large reward may be given in the case where vibration of the vehicle is in a predetermined range compared to the case where vibration of the vehicle is outside the predetermined range. That is, the process of giving a reward related to the drivability may be at least one of the following three processes. That is, the three processes include: a process of giving a large reward in the case where the behavior of the vehicle such as the acceleration and the rate of change in the acceleration (jerk) meets a criterion compared to the case where the behavior of the vehicle does not meet the criterion; a process of giving a large reward in the case where noise is within a predetermined range compared to the case where noise is not within the predetermined range; and a process of giving a large reward in the case where vibration of the vehicle is within a predetermined range compared to the case where vibration of the vehicle is not within the predetermined range.

4. General Matters about Internal Combustion Engine

A large reward may be given in the case where the water temperature THW is within a predetermined temperature range compared to the case where the water temperature THW is outside the predetermined temperature range. In addition, a large reward may be given in the case where the oil temperature Toil is within a predetermined temperature range compared to the case where the oil temperature Toil is outside the predetermined temperature range.

The disclosure is not limited to a configuration in which all of a reward related to the fuel consumption rate, a reward related to the exhaust characteristics, a reward related to the drivability, and a reward related to the required engine torque value Trqeg* (required engine output value Peg*) are given. For example, only one, only two, or only three of the four rewards may be given.

In the case where a reward related to the required engine torque value Trqeg* (required engine output value Peg*) is not given, the throttle opening degree command value Tor* may be set based on the accelerator operation amount ACCP, for example, not through reinforcement learning.

Incidentally, in the case where a reward related to the fuel consumption rate is given, it is desirable that the action should include at least one of the required injection amount Qf, the ignition timing aig, the injection distribution ratio Kp, the number of injections per combustion cycle, the intake phase difference command value DIN*, the WGV opening degree command value Wgvor, and the EGR opening degree command value Egrvor.

In the case where a reward related to the exhaust characteristics is given, it is desirable that the action should include at least one of the following. That is, it is desirable that the action should include at least one of the required injection amount Qf, the ignition timing aig, the injection distribution ratio Kp, the number of injections per combustion cycle, the intake phase difference command value DIN*, the WGV opening degree command value Wgvor, the EGR opening degree command value Egrvor, the fuel pressure command value Pf*, the purge operation amount Pg, and the number of ignitions per combustion cycle. The disclosure is not limited thereto, and the action may include at least one of the timing when fuel vapor trapped by the canister 66 is caused to flow out to the intake passage 12, the operation amount of tumble control valves, the operation amount of swirl control valves, and the timing to stop idling, which are described in "4. Action" under "Relationship Prescription Data". The action may also include the opening degree of an air bypass valve, the operation amount of a structure with a changeable intake passage for the case where the internal combustion engine 10 has such a structure, and whether one of a pair of intake valves 20 is selectively closed in the case where the internal combustion engine 10 includes a pair of intake valves 20 for each cylinder and one of such valves can be selectively kept closed, for example. The action may also include whether control for stopping combustion control for an air-fuel mixture in a particular cylinder is being executed in the case where such control is executed, and an operation of the compression ratio of the internal combustion engine 10 for the case where such a compression ratio is variable, for example. The action may also include the opening degree of a flow rate control valve, for example.

In the case where a reward related to the drivability is given, meanwhile, it is desirable that the action should include at least one of the throttle opening degree command value Tor*, the WGV opening degree command value Wgvor, and the hydraulic pressures Poila, Poilb, . . . .

5. Reward that Accompanies Operation of Speed Change Device

While a reward is determined in accordance with whether the logical product of the conditions (10) to (12) is true in the processes in S120 and S122, the disclosure is not limited thereto. For example, a large reward may be given in the case where each of the conditions (10) to (12) is met compared to the case where such a condition is not met.

It is not essential to use all the conditions (10) to (12) in the processes in S120 and S122. For example, a reward may be given based on only one or two of the three conditions (10) to (12).

The rewards based on the conditions (11) and (12) may be given successively during a period during which shifting is performed. The reward that accompanies an operation of the transmission is not limited to a reward based on the viewpoint of the drivability as discussed above. For example, in the case where the action includes the control amount of the transmission 80 as described in "4. Action" under "Relationship Prescription Data", a reward related to the fuel consumption rate may also be used.

5. Reward Related to Hybrid Vehicle

While the lower limit value of a predetermined range is not determined in executing a process of giving a large reward in the case where the battery temperature Tbatt is within the predetermined range compared to the case where the battery temperature Tbatt is outside the predetermined range in the embodiments described above, the disclosure is not limited thereto.

The disclosure is not limited to the use of both a reward that matches the charging rate SOC and a reward that matches the battery temperature Tbatt. For example, only one of two such rewards may be used.

None of a reward that matches the charging rate SOC and a reward that matches the battery temperature Tbatt may be used. For example, a large reward may be given in the case where the absolute value of the difference between the required output value Ptot* and the output Ptot is small compared to the case where the absolute value of such a difference is large, or a large reward may be given in the case where the absolute value of the difference between the required drive torque value Trq* and the drive torque Trq is small compared to the case where the absolute value of such a difference is large. In such cases, the power distribution between the internal combustion engine 10 and the first motor/generator 162 and the second motor/generator 166 for achieving the required output value Tot* and the required drive torque value Trq* can be learned through reinforcement learning.

6. Other Rewards

In the case where the action includes whether the lock-up clutch 72 is engaged as described in "4. Action" under "Relationship Prescription Data", for example, a large reward may be given in the case where the sound pressure is equal to or less than a predetermined value compared to the case where the sound pressure is more than the predetermined value.

7. Timing to Calculate Reward

In the processes in FIGS. 4 and 10, a reward rt is calculated immediately after an operation based on the action at is performed. In this case, the fact that the upstream-side detection value Afu etc. acquired immediately after an operation based on the action at in the steady state can be considered to accompany the action at is utilized, since it takes time before the result of the action at is reflected in the upstream-side detection value Afu or the downstream-side detection value Afd. However, the disclosure is not limited to such a technique, and the upstream-side detection value Afu etc. which accompany the action at and are used to calculate the reward rt may be sampled at a timing shifted with respect to the timing of an operation based on the action at, by shifting the timing of an operation based on the selected action at and an update of the action value function Q, for example.

Instead, a Monte Carlo method may be used to deal with such an issue, instead of successively giving rewards.

Select Process

A greedy action may be inevitably selected in the process in S44 in FIG. 10, and the processes in S42 to S46 may be repeatedly performed with the processes in S50a to S54 and S58 deleted. In the case where an action value function is expressed by a function approximator, the process in S44 may be a process of exploring a maximum value based on the partial differential etc. with respect to each component of the action a. Instead, only discrete values may be defined for the action a, and candidates for an action may be input to a function approximator, to which the state acquired in the process in S42 has been input, to select an action that maximizes the output value of the function approximator. In this case, the output values of the function approximator may be standardized in advance by a soft-max function prior to the selection.

Method of Generating Vehicle Control Data

While a process of determining an action based on the action value function Q is indicated in the process in S44 in FIG. 4, the disclosure is not limited thereto. All the actions that may be taken may be selected with equal probabilities in the process of generating vehicle control data etc. before shipment of the vehicle.

Control Mapping Data

While input variables of all the operation amounts are the same in the processes in FIG. 2, the disclosure is not limited thereto. For example, a state with a low correlation with the setting of the operation amounts may be deleted. This is suitably achieved by updating the parameter θ by using an L1 regularization term when executing reinforcement learning using a function approximator, for example.

The control mapping data to which the state of the vehicle is input and which output the operation amounts of the operable portions of the internal combustion engine 10 that maximize the expected profit by making one-to-one correspondence between the state of the vehicle and such operation amounts are not limited to the map data 96b. For example, the parameter θ of the policy π may be updated through a policy gradient method, instead of updating the action value function Q in the processes in FIG. 4, and a function approximator itself which determines average values μ (1), μ, (2), . . . after learning may be installed in the control device 90 as the control mapping data. Consequently, it is only necessary for the CPU 92 to calculate average values μ (1), μ (2), . . . using the state s as an input to the function approximator, and operate operation signals MS1, MS2, . . . using such average values as the operation amounts.

The control mapping data are not limited to data that prescribe mapping to which the state of the vehicle is input and which outputs the operation amounts of the operable portions of the internal combustion engine 10, and may be data that prescribe mapping to which the state of the vehicle is input and which outputs the operation amount and the control amount of the transmission 80, for example. The control mapping data may also be data that prescribe mapping to which the state of the vehicle is input and which outputs the control amounts of the first motor/generator 162 and the second motor/generator 166, for example.

Method of Generating Control Mapping Data

In the processes in FIG. 4, in the case where an affirmative determination is made in the process in S56, a set of each state s and the greedy action a may be defined as a representative point, an action in the domain of definition of an independent variable of the action value function may be redefined as a representative point and a value shifted from the representative point by one unit, and the processes in S42 to S56 may be repeated. It is not essential that a representative point and a value shifted from the representative point by one unit should be in the domain of definition itself.

While an action a that maximizes the value of the action value function Q as a table-type function is selected in accordance with the state s and map data are generated based on a set of the state s and the action a in the processes indicated in FIG. 6, the disclosure is not limited thereto. For example, the action value function Q which is expressed by a function approximator may also be used. The disclosure is also not limited to the use of the action value function Q. For example, the parameter θ of the policy π may be updated through a policy gradient method, instead of updating the action value function Q in the processes in FIG. 4, and the average value μ which is determined in accordance with the state s may be used as an action in the processes in FIG. 6.

Vehicle Control System

While a reward is calculated by the data analysis center 200 in the example illustrated in FIG. 20, the disclosure is not limited thereto. A reward may be calculated on the control device 90 side, and transmitted to the data analysis center 200.

While a policy gradient method is used in the examples illustrated in FIG. 18 and FIG. 20, the disclosure is not limited thereto. For example, the action value function Q of the table type or the action value function Q which is expressed by a function approximator may also be used.

Execution Device

The execution device is not limited to that including the CPU 92 (152, 202) and the ROM 94 (154, 204) to execute software processing. For example, the execution device may include a dedicated hardware circuit (e.g. an ASIC etc.) that performs hardware processing for at least some of processes subjected to software processing in the embodiments described above. That is, the execution device may have any of the following configurations (a) to (c).

(a) The execution device includes a processing device that executes all of the processes described above in accordance with a program and a program storage device, such as a ROM, that stores the program.

(b) The execution device includes a processing device that executes some of the processes described above in accordance with a program, a program storage device, and a dedicated hardware circuit that executes the remaining processes.

(c) The execution device includes a dedicated hardware circuit that executes all of the processes described above. The execution device may include a plurality of software execution devices, which each include a processing device and a program storage device, or dedicated hardware circuits.

Storage Device

While the storage device which stores the relationship prescription data 96a, 156a and the storage device (ROM 94, 154, 204) which stores the learning program 94a, 154a, the control program 94b, the sub control program 94c, and the main control program 204a are separate storage devices in the embodiments described above, the disclosure is not limited thereto. In addition, while the learning program 94a, 154a does not include data on the learning rate α and the learning program 94a, 154a itself is stored in the ROM 94, 154, 204 in the embodiments described above, the learning rate a may be stored in the storage device 96, 156, 206, for example.

Internal Combustion Engine

The internal combustion engine is not limited to that including both the port injection valve 18 and the in-cylinder injection valve 28, and may include only one of the two types of fuel injection valves. It is not essential that the internal combustion engine 10 should include the supercharger 14. In addition, the internal combustion engine 10 may not include the EGR passage 52 or the EGR valve 54, for example. In the case where the supercharger 14 is not provided, a purge valve may be used, in place of the purge pump 68, as a regulation device that regulates the flow rate of fuel vapor from the canister 66 to the intake passage 12. In that case, the action may include the opening degree etc. of the purge valve.

The internal combustion engine is not limited to a spark-ignition internal combustion engine, and may be a compression-ignition internal combustion engine etc. which uses light oil etc. as fuel, for example.

Hybrid Vehicle

The hybrid vehicle is not limited to a series-parallel hybrid vehicle, and may be a series hybrid vehicle or a parallel hybrid vehicle, for example.

Others

The drive circuit of the rotary electric machine is not limited to an inverter, and an H bridge circuit may also be used in the case where the rotary electric machine is a DC rotary electric machine, for example. The power accumulation device is not limited to the battery 170, and may be a capacitor, for example.

What is claimed is:

1. A method of generating vehicle control data comprising:
    storing, with a storage device, relationship prescription data which are data that prescribe a relationship between a state of a vehicle that includes an internal combustion engine and an operation amount of an operable portion of the internal combustion engine, the state of the vehicle including a state of the internal combustion engine;
    operating, with an execution device, the operable portion;
    acquiring, with the execution device, a detection value from a sensor that detects the state of the vehicle;
    calculating, with the execution device, a reward from a viewpoint of at least one of a fuel consumption rate, an exhaust characteristic, and a drivability based on the detection value; and
    updating, with the execution device, the relationship prescription data using update mapping determined in advance, the update mapping using the state of the vehicle based on the detection value, an operation amount which is used to operate the operable portion, and the reward corresponding to the operation as arguments, and returning the relationship prescription data which have been updated such that an expected profit for the reward calculated when the operable portion is operated in accordance with the relationship prescription data increases.

2. The method of generating vehicle control data according to claim 1, wherein:
    the reward is larger when the exhaust characteristic corresponds to a predetermined characteristic than when the exhaust characteristic do not correspond to the predetermined characteristic; and
    the predetermined characteristic includes at least one of an amount of emission of nitrogen oxides falling within a predetermined range, an amount of emission of unburned fuel falling within a predetermined range, an amount of emission of particulate matter falling within a predetermined range, and a temperature of a catalyst provided in an exhaust passage of the internal combustion engine falling within a predetermined range.

3. The method of generating vehicle control data according to claim 1, wherein the execution device calculates the reward such that at least one of following conditions is met: the reward which has been quantified from the viewpoint of the drivability is larger when an acceleration of the vehicle falls within a first predetermined range than when the acceleration of the vehicle is outside the first predetermined range; the reward which has been quantified from the viewpoint of the drivability is larger when a jerk of the vehicle falls within a second predetermined range than when the jerk is outside the second predetermined range; and the reward which has been quantified from the viewpoint of the drivability is larger when a level of sound generated by the internal combustion engine falls within a third predetermined range than when the level of the sound is outside the third predetermined range.

4. The method of generating vehicle control data according to claim 1, further comprising: generating, with the execution device, control mapping data using the state of the vehicle as an argument and returning the operation amount which maximizes the expected profit by making one-to-one correspondence between the state of the vehicle and the operation amount which maximizes the expected profit based on the relationship prescription data which is updated.

5. A vehicle control device comprising a storage device and an execution device configured to perform a method including:
    storing, with a storage device, relationship prescription data which are data that prescribe a relationship between a state of a vehicle that includes an internal combustion engine and an operation amount of an operable portion of the internal combustion engine, the state of the vehicle including a state of the internal combustion engine;
    operating, with an execution device, the operable portion;
    acquiring, with the execution device, a detection value from a sensor that detects the state of the vehicle;
    calculating, with the execution device, a reward from a viewpoint of at least one of a fuel consumption rate, an exhaust characteristic, and a drivability based on the detection value; and
    updating, with the execution device, the relationship prescription data using update mapping determined in advance, the update mapping using the state of the vehicle based on the detection value, an operation amount which is used to operate the operable portion, and the reward corresponding to the operation as arguments, and returning the relationship prescription data which have been updated such that an expected profit for the reward calculated when the operable portion is operated in accordance with the relationship prescription data increases, wherein the execution device is configured to operate the operable portion based on the operation amount which is determined in accordance with the relationship prescription data and the state of the vehicle.

6. The vehicle control device according to claim 5, wherein the execution device is configured to
acquire, as the detection value, a required value and a calculated value of at least one of an output and torque of the internal combustion engine, and
calculate the reward such that the reward is larger when an absolute value of a difference between the required value and the calculated value is equal to or less than a predetermined value than when the absolute value is more than the predetermined value.

7. The vehicle control device according to claim 5, wherein:
the vehicle includes a transmission configured to change a speed of rotation output from a crankshaft of the internal combustion engine and output rotation having a changed speed, and configured to change a speed ratio;
the relationship which is prescribed by the relationship prescription data includes a relationship between a state of the transmission and an operation amount of the transmission; and
the execution device is configured to
acquire, as the detection value, a value detected by a sensor configured to detect the state of the transmission,
calculate the reward such that at least one of following conditions is met: the reward is larger when a time required for the transmission to switch the speed ratio falls within a predetermined time than when the time exceeds the predetermined time; the reward is larger when an absolute value of a speed of change in a rotational speed of an input shaft of the transmission is equal to or less than a predetermined input-side value than when the absolute value of the speed of change in the rotational speed of the input shaft is more than the predetermined input-side value; the reward is larger when an absolute value of a speed of change in a rotational speed of an output shaft of the transmission is equal to or less than a predetermined output-side value than when the absolute value of the speed of change in the rotational speed of the output shaft is more than the predetermined output-side value; and the reward is larger when a hydraulic pressure regulated by a solenoid valve of the transmission meets a predetermined condition than when the hydraulic pressure does not meet the predetermined condition, and
update the relationship between the state of the transmission and the operation amount of the transmission prescribed by the relationship prescription data, by using the detection value and related to the state of the transmission as the argument of the update mapping.

8. The vehicle control device according to claim 5, wherein:
the vehicle includes a rotary electric machine configured to provide power to drive wheels;
the relationship which is prescribed by the relationship prescription data includes a relationship between a state of a power accumulation device that supplies electric power to the rotary electric machine and a control amount of the rotary electric machine; and
the execution device is configured to
operate a drive circuit of the rotary electric machine,
acquire the state of the power accumulation device as the detection value,
calculate the reward such that the reward is larger when the state of the power accumulation device falls within a predetermined range than when the state of the power accumulation device is outside the predetermined range, and
update the relationship between the state of the power accumulation device and the control amount of the rotary electric machine prescribed by the relationship prescription data, by using the state of the power accumulation device and the control amount of the rotary electric machine as arguments of the update mapping.

9. The vehicle control device according to claim 8, wherein the execution device is configured to
acquire, as the detection value, a required value and a calculated value of at least one of an output and drive torque of the vehicle, and
calculate the reward such that the reward is larger when an absolute value of a difference between the required value and the calculated value for the at least one of the output and the drive torque of the vehicle is equal to or less than a predetermined value than when the absolute value is more than the predetermined value.

10. The vehicle control device according to claim 5, wherein:
the relationship prescription data includes data that prescribe a relationship among the state of the vehicle, the expected profit, and the operation amount;
the execution device is further configured to select an operation amount that increases the expected profit in priority to an operation amount that reduces the expected profit based on the detection value and the relationship prescription data; and
the execution device is configured to operate the operable portion based on the operation amount which is selected.

11. The vehicle control device according to claim 5, wherein:
the relationship prescription data are data that prescribe a function approximator that uses the state of the vehicle as an argument and that returns a probability of selecting the operation amount; and
the update mapping includes mapping that returns an update amount of a parameter that prescribes the function approximator.

12. The vehicle control device according to claim 5, wherein:
the reward is larger when the exhaust characteristic corresponds to a predetermined characteristic than when the exhaust characteristic do not correspond to the predetermined characteristic; and
the predetermined characteristic includes at least one of an amount of emission of nitrogen oxides falling within a predetermined range, an amount of emission of unburned fuel falling within a predetermined range, an amount of emission of particulate matter falling within a predetermined range, and a temperature of a catalyst provided in an exhaust passage of the internal combustion engine falling within a predetermined range.

13. The vehicle control device according to claim 5, wherein the execution device is configured to calculate the reward such that at least one of following conditions is met: the reward which has been quantified from the viewpoint of the drivability is larger when an acceleration of the vehicle falls within a first predetermined range than when the acceleration of the vehicle is outside the first predetermined range; the reward which has been quantified from the viewpoint of the drivability is larger when a jerk of the vehicle falls within a second predetermined range than when the jerk is outside the second predetermined range; and the reward which has been quantified from the viewpoint of the drivability is larger when a level of sound generated by the internal combustion engine falls within a third predetermined range than when the level of the sound is outside the third predetermined range.

14. A vehicle control system comprising: a vehicle control device including a storage device and an execution device configured to perform a method including:
    storing, with a storage device, relationship prescription data which are data that prescribe a relationship between a state of a vehicle that includes an internal combustion engine and an operation amount of an operable portion of the internal combustion engine, the state of the vehicle including a state of the internal combustion engine;
    operating, with an execution device, the operable portion;
    acquiring, with the execution device, a detection value from a sensor that detects the state of the vehicle;
    calculating, with the execution device, a reward from a viewpoint of at least one of a fuel consumption rate, an exhaust characteristic, and a drivability based on the detection value; and
    updating, with the execution device, the relationship prescription data using update mapping determined in advance, the update mapping using the state of the vehicle based on the detection value, an operation amount which is used to operate the operable portion, and the reward corresponding to the operation as arguments, and returning the relationship prescription data which have been updated such that an expected profit for the reward calculated when the operable portion is operated in accordance with the relationship prescription data increases,
wherein:
    the execution device is configured to operate the operable portion based on the operation amount which is determined in accordance with the relationship prescription data and the state of the vehicle,
    the execution device includes a first execution device mounted on the vehicle and a second execution device that is separate from in-vehicle devices;
    the first execution device executes at least the acquiring and the operating; and
    the second execution device executes at least the updating.

15. The vehicle control system according to claim 14, wherein:
    the first execution device is further configured to
        transmit data related to the detection value to the second execution device,
        receive the operation amount which is transmitted by the second execution device, and
        operate the operable portion based on the operation amount which is received from the second execution device; and
    the second execution device is further configured to
        receive the data which are transmitted by the first execution device,
        calculate the operation amount based on the data which are received from the first execution device and the relationship prescription data, and
        transmit the calculated operation amount.

16. The vehicle control device according to claim 14, wherein the execution device is configured to
    acquire, as the detection value, a required value and a calculated value of at least one of an output and torque of the internal combustion engine, and
    calculate the reward such that the reward is larger when an absolute value of a difference between the required value and the calculated value is equal to or less than a predetermined value than when the absolute value is more than the predetermined value.

17. The vehicle control device according to claim 14, wherein:
    the vehicle includes a transmission configured to change a speed of rotation output from a crankshaft of the internal combustion engine and output rotation having a changed speed, and configured to change a speed ratio;
    the relationship which is prescribed by the relationship prescription data includes a relationship between a state of the transmission and an operation amount of the transmission; and
    the execution device is configured to
        acquire, as the detection value, a value detected by a sensor configured to detect the state of the transmission,
        calculate the reward such that at least one of following conditions is met: the reward is larger when a time required for the transmission to switch the speed ratio falls within a predetermined time than when the time exceeds the predetermined time; the reward is larger when an absolute value of a speed of change in a rotational speed of an input shaft of the transmission is equal to or less than a predetermined input-side value than when the absolute value of the speed of change in the rotational speed of the input shaft is more than the predetermined input-side value; the reward is larger when an absolute value of a speed of change in a rotational speed of an output shaft of the transmission is equal to or less than a predetermined output-side value than when the absolute value of the speed of change in the rotational speed of the output shaft is more than the predetermined output-side value; and the reward is larger when a hydraulic pressure regulated by a solenoid valve of the transmission meets a predetermined condition than when the hydraulic pressure does not meet the predetermined condition, and
        update the relationship between the state of the transmission and the operation amount of the transmission prescribed by the relationship prescription data, by using the detection value and related to the state of the transmission as the argument of the update mapping.

18. The vehicle control device according to claim 14, wherein:
    the vehicle includes a rotary electric machine configured to provide power to drive wheels;
    the relationship which is prescribed by the relationship prescription data includes a relationship between a state of a power accumulation device that supplies electric power to the rotary electric machine and a control amount of the rotary electric machine; and the execution device is configured to
- operate a drive circuit of the rotary electric machine,
- acquire the state of the power accumulation device as the detection value,
- calculate the reward such that the reward is larger when the state of the power accumulation device falls within a predetermined range than when the state of the power accumulation device is outside the predetermined range, and
- update the relationship between the state of the power accumulation device and the control amount of the rotary electric machine prescribed by the relationship prescription data, by using the state of the power accumulation device and the control amount of the rotary electric machine as arguments of the update mapping.

19. The vehicle control device according to claim 18, wherein the execution device is configured to
- acquire, as the detection value, a required value and a calculated value of at least one of an output and drive torque of the vehicle, and
- calculate the reward such that the reward is larger when an absolute value of a difference between the required value and the calculated value for the at least one of the output and the drive torque of the vehicle is equal to or less than a predetermined value than when the absolute value is more than the predetermined value.

20. The vehicle control device according to claim 14, wherein:
- the relationship prescription data includes data that prescribe a relationship among the state of the vehicle, the expected profit, and the operation amount;
- the execution device is further configured to select an operation amount that increases the expected profit in priority to an operation amount that reduces the expected profit based on the detection value and the relationship prescription data; and
- the execution device is configured to operate the operable portion based on the operation amount which is selected.

* * * * *